United States Patent
Abramson et al.

(10) Patent No.: US 7,133,746 B2
(45) Date of Patent: Nov. 7, 2006

(54) AUTONOMOUS MACHINE FOR DOCKING WITH A DOCKING STATION AND METHOD FOR DOCKING

(75) Inventors: Shai Abramson, Pardesia (IL); Alon Gandel, Raanana (IL)

(73) Assignee: F Robotics Acquistions, Ltd., Kadima (IL)

( * ) Notice: Subject to any disclaimer, the term of this patent is extended or adjusted under 35 U.S.C. 154(b) by 0 days.

(21) Appl. No.: 10/617,934

(22) Filed: Jul. 11, 2003

(65) Prior Publication Data

US 2005/0010330 A1    Jan. 13, 2005

(51) Int. Cl.
G05B 19/04 (2006.01)
G05B 19/18 (2006.01)

(52) U.S. Cl. .............. 700/259; 700/245; 700/246; 700/249; 700/250; 700/256; 700/264; 318/568.1; 318/568.12; 701/23; 900/1; 900/46; 900/47

(58) Field of Classification Search .............. 700/259, 700/245–246, 249–250, 256, 264; 318/568.1, 318/568.12, 580–581, 587; 701/23–26, 300–301; 900/1, 46–47; 15/319
See application file for complete search history.

(56) References Cited

U.S. PATENT DOCUMENTS

| | | | |
|---|---|---|---|
| 5,632,404 A * | 5/1997 | Walsh ............... 229/5.81 |
| 5,787,545 A | 8/1998 | Colens et al. |
| 6,076,226 A | 6/2000 | Reed |
| 6,278,917 B1 | 8/2001 | Bauer et al. |
| 6,308,114 B1 * | 10/2001 | Kim ............... 700/245 |
| 6,389,329 B1 * | 5/2002 | Colens ............... 700/262 |
| 6,448,297 B1 * | 9/2002 | Turowski-Wanke et al. .. 516/56 |
| 6,586,908 B1 | 7/2003 | Petersson et al. |
| 6,636,781 B1 * | 10/2003 | Shen et al. ............... 700/248 |
| 6,748,297 B1 | 6/2004 | Song et al. |
| 6,760,647 B1 * | 7/2004 | Nourbakhsh et al. ....... 700/245 |
| 2003/0060928 A1 * | 3/2003 | Abramson et al. .......... 700/245 |
| 2003/0120389 A1 * | 6/2003 | Abramson et al. .......... 700/245 |
| 2004/0204792 A1 * | 10/2004 | Taylor et al. ............... 700/245 |
| 2004/0211444 A1 * | 10/2004 | Taylor et al. ............... 134/18 |
| 2004/0225462 A1 * | 11/2004 | Renken et al. ............... 702/94 |
| 2004/0236468 A1 * | 11/2004 | Taylor et al. ............... 700/245 |
| 2004/0244138 A1 * | 12/2004 | Taylor et al. ............... 15/319 |
| 2005/0000543 A1 * | 1/2005 | Taylor et al. ............... 134/18 |
| 2005/0010331 A1 * | 1/2005 | Taylor et al. ............... 700/245 |

OTHER PUBLICATIONS

Siverman et al., Staying Alive: A docking station for autonomous robot recharging, 2002, IEEE, pp. 1050-1055.*
Chardard et al., Swimmer: Final sea demonstration of thid innovative hybrid AUV/ROV system, 2002, IEEE, pp. 17-23.*
Thrum et al., Probilityalgorithms and the interactive Museum tour-guide robot Minerva, 2000, Internet, p. 1-35.*

* cited by examiner

Primary Examiner—Thomas G. Black
Assistant Examiner—McDieunel Marc
(74) Attorney, Agent, or Firm—Lathrop & Gage LC

(57) ABSTRACT

An autonomous robot is designed for docking in a docking station. The autonomous robot is configured such that it will locate the docking station and dock therein, before its battery power is exhausted. The docking is such that the autonomous robot is automatically charged, such that its batteries will be fully powered for the subsequent operation.

25 Claims, 20 Drawing Sheets

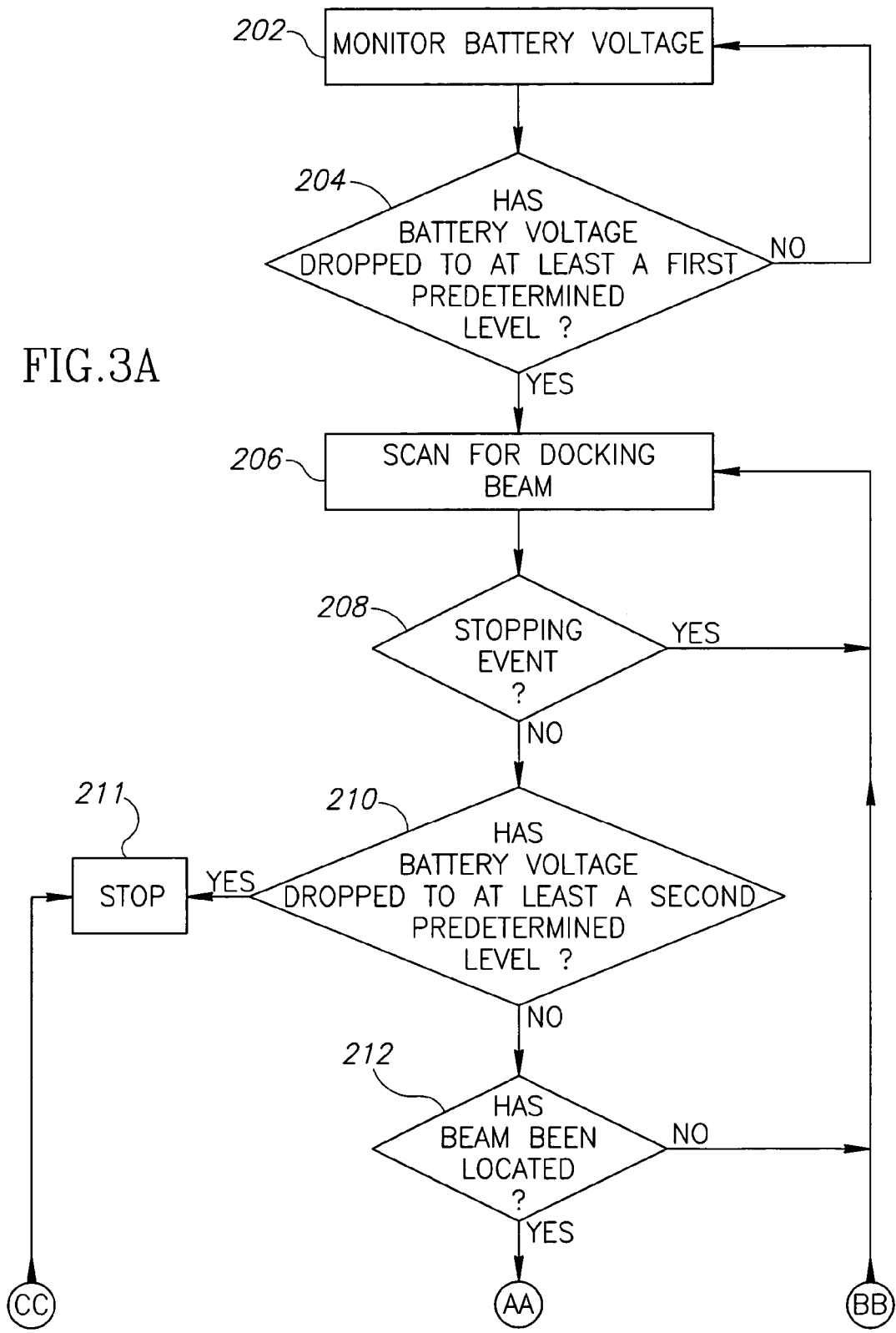

AUTONOMOUS MACHINE FOR DOCKING WITH A DOCKING STATION AND METHOD FOR DOCKING

TECHNICAL FIELD

The present invention is directed to autonomous machines, such as robots, these robots typically designed to perform tasks such as vacuum cleaning, lawnmowing, floor sweeping and maintenance. In particular, the present invention is directed to methods and systems for docking these autonomous machines in docking stations.

BACKGROUND

Autonomous machines and devices, such as autonomous robots, have been designed for performing various industrial and domestic functions. These domestic functions include vacuum cleaning, lawn mowing, floor sweeping and maintenance. By extending robots to these domestic functions, the person or user employing these robots has increased free or leisure time, as they do not have to expend the time required to perform the aforementioned tasks manually.

These autonomous robots typically operate in accordance with various computer programs that are part of the operating systems. Additionally, many of these autonomous robots are battery powered, and need to be charged once they are out of battery power. Additionally, if out of battery power, these autonomous robots typically stop where the power ran out and may be troublesome to locate or in difficult places to reach.

As a result, the autonomous robot must be located and manually brought to the charging unit, typically an electrical outlet. These processes require the user taking the time to perform them. Additional time is wasted as the user typically must wait a few hours before the robot is recharged, so it can start fresh again with fully charged batteries.

SUMMARY

The present invention improves on the contemporary art as it provides an autonomous robot, a docking station and a method for docking the robot therein. The autonomous robot is configured such that it will dock at this docking station located at a known location, before its battery power is exhausted. The docking is such that the autonomous robot is automatically charged, such that its batteries will be fully powered for the subsequent operation.

An embodiment of the invention is directed to an autonomous robot. This robot has a system for moving it over a surface, a power system for providing power to it, and including at least one sensor for detecting power levels, and a control system in communication with the moving system, and the power system. The control system has a processor, for example a microprocessor, programmed to: monitor the power level of the power system; initiate a docking process for the robot to return to a docking station when the power level has fallen to a first a predetermined level; and continue the docking process by causing the robot to move toward the docking station. This robot can be used for multiple functions, for example, vacuum cleaning and lawn mowing.

Another embodiment of the invention is also directed to an autonomous robot. This robot includes a system for moving the robot over a surface, at least one sensor (e.g., a receiver, typically an infrared (IR) light receiver) for detecting a signal from a docking station, a power system for providing power to the robot, the power system including at least one sensor for detecting power levels; and a control system in communication with the moving system, the at least one sensor for detecting the docking station signal, and the power system. The control system includes a processor, for example, a microprocessor, programmed to: monitor the power level of the power system; initiate a docking process for the robot to return to a docking station when the power level has fallen to or below a first predetermined level; and continue the docking process. The processor is programmed to continue the docking process by: receiving at least one signal from the at least one sensor that a signal for a docking station has been detected; and responding to the received at least one signal by causing the movement system to move the robot toward the docking station. This robot can be used for multiple functions, for example, vacuum cleaning and lawn mowing.

Another embodiment is directed to a docking station for an autonomous robot. The docking station has at least one transmitter for transmitting a docking beam, the docking beam including at least a first portion of a first range and a second portion of a second range; and at least one contact member configured for receiving a corresponding contact member on a robot in a docking contact. The docking station also has a charging system for transporting electricity to the robot when the docking contact is made.

Another embodiment is directed to a method for docking an autonomous robot in a docking station. The autonomous robot that performs this method, also performs functions such as vacuum cleaning, lawn mowing, etc. This method includes monitoring battery voltage of the robot, initiating docking of the robot in the docking station when the battery voltage has been detected to have fallen to at least a first predetermined level, locating at least one signal for the docking station, and moving the robot toward the docking station. The locating the docking station signal and moving the robot toward the docking station continue while the battery voltage remains between the first predetermined level and a second predetermined level, the second predetermined level less than the first predetermined level. Should the battery voltage fall to at least the second predetermined level, the robot will stop. This method also includes ceasing robot movement once the robot has docked in the docking station and a docking contact between the robot and the docking station is established. This docking contact is typically a physical contact as well as an electrical contact, allowing electricity to be passed from the docking station to the robot, for charging its battery or batteries when the robot is at rest and docked in the docking station. Additionally, the locating at least one signal for the docking station includes two signal detections. First, the robot seeks and detects a signal from the docking station for a first time, and then detects the signal from the docking station for a second time, typically confirming the location of the docking station.

Another embodiment of the invention is directed to a method for docking an autonomous robot in a docking station. The autonomous robot that performs this method, also performs functions such as vacuum cleaning, lawn mowing, etc. This method includes monitoring battery voltage of the robot; initiating docking of the robot in the docking station when the battery voltage has been detected to have fallen to at least a first predetermined level; locating at least one signal for the docking station and confirming that the at least one signal for the docking station has been located, and moving the robot toward the docking station. The locating and confirming the docking station signal and moving the robot toward the docking station occur while the battery voltage remains between the first predetermined level and a second predetermined level, the second predetermined level less than the first predetermined level. Otherwise, should the battery voltage drop to at least the second predetermined level, the robot ceases movement. This method also includes ceasing robot movement once the robot has docked in the docking station and a docking contact between the robot and the docking station is established. This docking contact is typically a physical contact as well as an electrical contact, allowing electricity to be passed from the docking station to the robot, for charging its battery or batteries when the robot is at rest and docked in the docking station.

BRIEF DESCRIPTION OF THE DRAWINGS

Attention is now directed to the drawing figures, where like numerals and/or characters indicate corresponding or like components. In the drawings:

FIGS. 3A and 3B form a flow diagram outlining a docking process in accordance with an embodiment of the present invention;

DETAILED DESCRIPTION OF THE DRAWINGS

Figure 1:
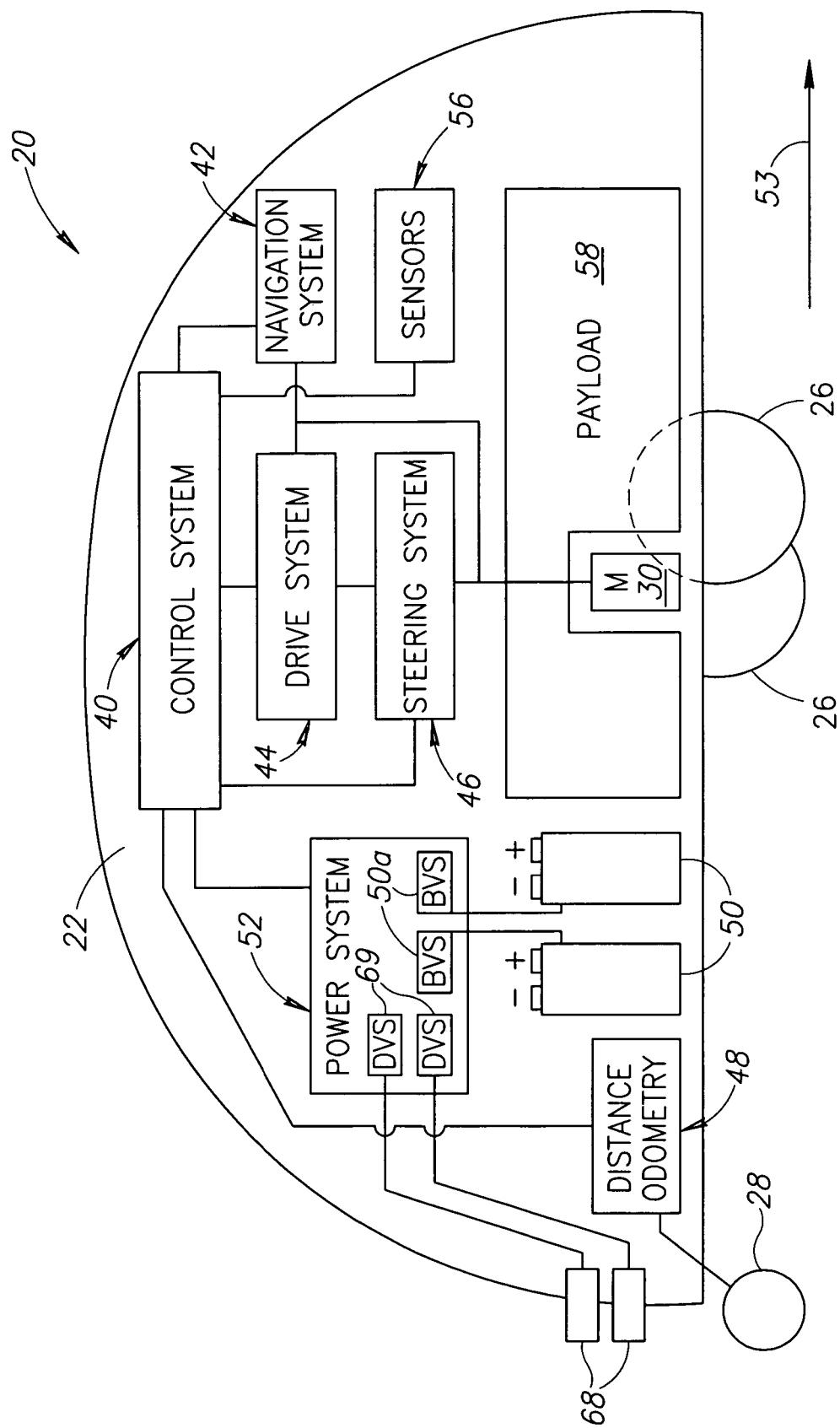
FIG. 1 is a diagram of an apparatus in accordance with an embodiment of the invention.
Figure 2:
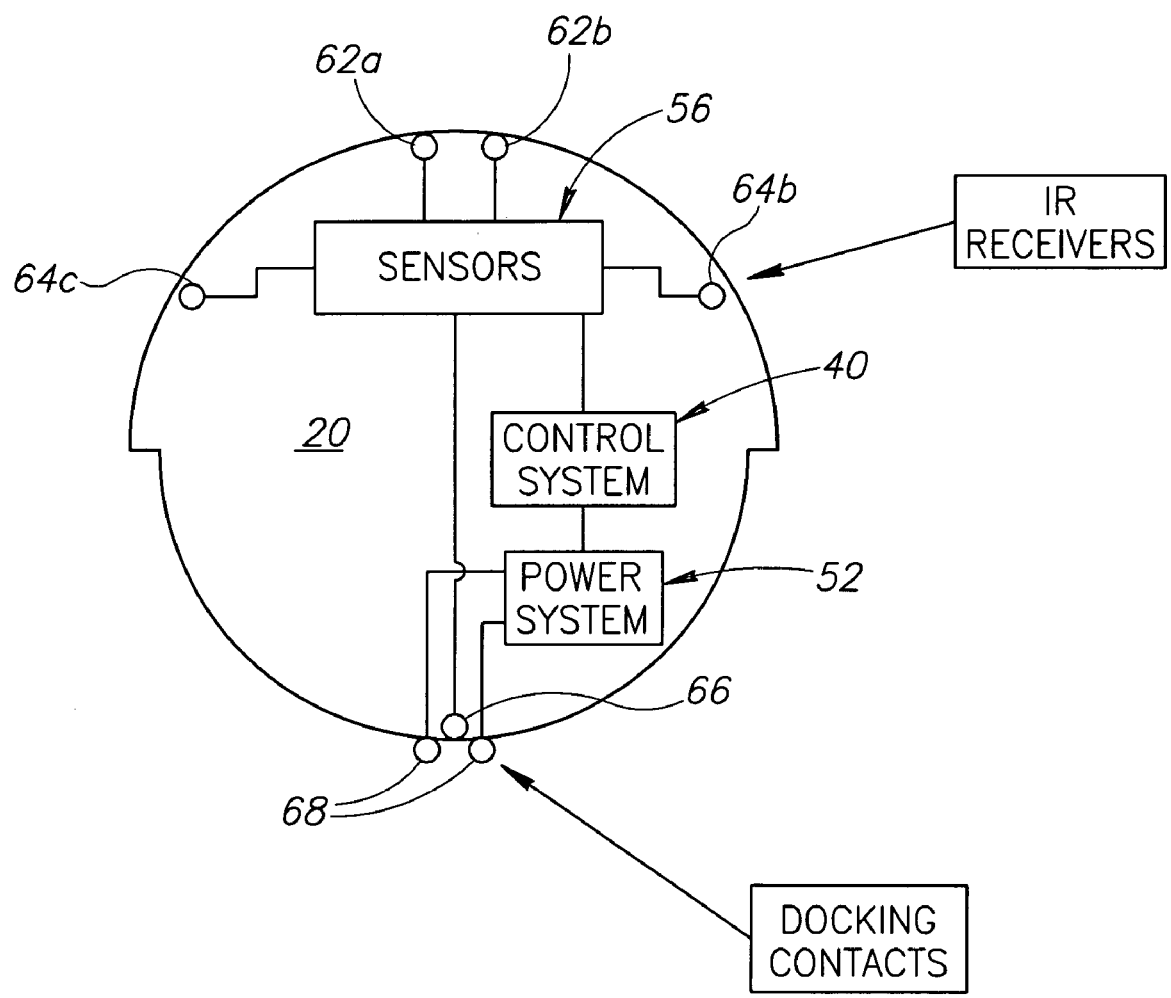
FIG. 2 is a schematic diagram of the sensor and docking contact arrangement in the apparatus of FIG. 1.

FIGS. 1 and 2 show an apparatus 20 or platform of the present invention, that is an autonomous machine or autonomous robot. The apparatus 20 is such that it can be received by a docking station 100. In this docking station 100, the apparatus 20 will return to it once its task is complete, for orderly control and arrangement of the apparatus 20. While in this docking station 100, various functions can occur, such as battery recharging and the like.

The apparatus 20 typically includes a body 22, supported by a chassis 24, that supports various mechanical and electrical components, and systems involving these components. The body 22 and chassis 24 ride on wheels 26, 28 rollers or the like, that with the related electronics, components and systems, as detailed below, as well as combinations thereof, form a movement system for the apparatus 20 (for moving the apparatus 20 over a surface or the like).

There are at least two oppositely disposed wheels 26 at the sides of the apparatus 20, each driven by motors (M) 30 (independent of each other), to allow for steering of the apparatus 20. There is also typically one non-motorized or passive wheel 28, typically at the rear of the apparatus 20, used to measure distance, direction and the like.

These motors (M) 30 are typically computer controlled, by a control system 40, typically processor (microprocessor) based. The motorized 26 and/or non-motorized 28 wheels may be part of a navigation system 42, a drive system 44, steering system 46, with the passive wheel 28 part of a distance measuring/odometry system 48. All of the aforementioned systems are integrated and typically part of and controlled by the control system 40, and allow for movement of the apparatus 20 as well as performing the processes and methods detailed below.

The apparatus 20 is typically powered by batteries 50, typically rechargeable, that form part of a power system 52, that is electrically coupled to the control system 40. Battery voltage sensors (BVS) 50a, typically for each battery 50, are also part of the power system 52. The forward and typical direction of movement for the apparatus 20 is indicated by the arrow 53.

The apparatus 20 also includes sensors, for example, for obstacle detection, obstruction detection, boundary detection, proximity detection to objects and/or boundaries. These sensors form a sensor system 56, that is coupled to the control system 40 and are under the control thereof.

The apparatus 20 also includes a payload 58, coupled to the control system 40. This payload 58 can be designed for various tasks. For example, the payload can be a system suitable for vacuum cleaning, but can also be designed for lawn mowing, surface cleaning, floor sweeping and the like.

Turning also to FIG. 2, The apparatus 20 includes front 62a, 62b, lateral 64a, 64b, and rear 66, receivers, that typically function as sensors. These receivers 62a, 62b, 64a, 64b, 66 are exemplary, and more and/or fewer receivers are also permissible. The receivers are for example, infra-red (IR) light receivers and placed into the apparatus 20 similar to the aforementioned sensors, and typically form part of the sensor system 56, that is coupled to the control system 40.

The apparatus 20 also includes docking contacts 68, typically at its rear. These docking contacts 68 are typically metal or other magnetic or electrically conducting materials. These docking contacts 68 are electrically coupled to the control system 40, for example, through the power system 52. Voltage sensors (DVS) 69, typically for each of the docking contacts 68, and electrically coupled to the docking contacts 68 and the control system 40, are also typically part of the power system 52.

For example, one such autonomous machine or robot, suitable as the apparatus 20 here, including its components and systems, and operational and work modes, including scanning patterns, is detailed in commonly owned U.S. Patent Application Publication No. 20030060928 A1, entitled: Robotic Vacuum Cleaner, this document incorporated by reference herein. The apparatus 20 is also suitable for operational and/or work modes, including scanning patterns, such as those detailed in commonly owned PCT International Application No. PCT/IL99/00248 (WO 99/59042), entitled Area Coverage With An Autonomous Robot, and U.S. Pat. No. 6,255,793, both of these documents incorporated by reference herein. While the apparatus 20 shown is a robotic vacuum cleaner, detailed above, any autonomous machine, robot or the like, that performs functions including lawn mowing, surface cleaning and the like, can be utilized.

The apparatus 20 can also be controlled at least partially by control units and controllers, such as those detailed in commonly owned U.S. Pat. Nos. 6,339,735 and 6,493,613, both patents entitled: Method For Operating A Robot. Both of these patents are incorporated by reference herein.

The docking station 100 includes docking contacts 110, that are typically metal, or other magnetic or electrically conducting material, and are typically spring mounted on the docking station 100. These docking contacts 110 are configured to correspond with the docking contacts 68 on the apparatus 20. Typically, these docking contacts 110 have smooth surfaces, so as to contact the corresponding docking contacts 68 of the apparatus 20, when docking is achieved, and the apparatus 20 rests in the docking station 100.

Also within this docking station 100 is one or more transmitters 114. This transmitter(s) 114 is/are typically infra-red (IR) light transmitters. Transmissions from this transmitter 114 are for example, in the form of a docking beam 120, for example in the IR frequency range. This docking beam 120 is formed of overlapping ranges 121, 122.

The first range 121 is the short range (shown in slanted lines), where continuous transmissions of a weak signal (weak beam), for example, approximately less then 50 cm, are emitted, for example, continuously, approximately 15 times per second. These transmissions are, for example, IR transmissions of a wavelength of approximately 920 nm at power levels to be detected by the apparatus 20 approximately 50 cm or less away from the docking station 100. The second or long range 122 (shown in dots) transmissions include strong transmissions. For example, these transmissions include IR transmissions of approximately 920 nm, emitted at a power levels so as to be detectable by the apparatus at distances of up to approximately 10 meters away from the docking station 100, and are made approximately 3–4 times a second.

Figure 3B:
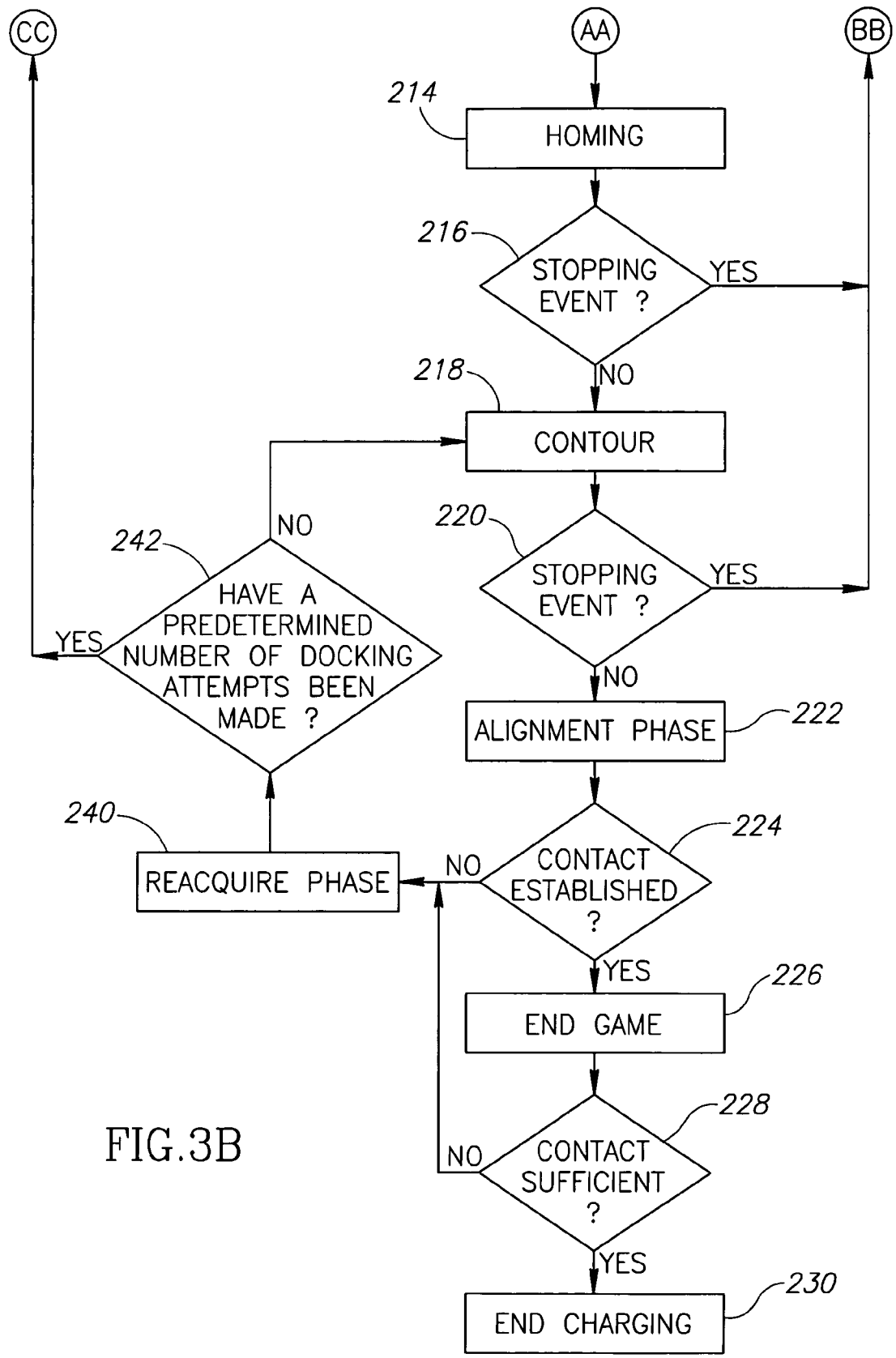

FIGS. 3A and 3B are a flow diagram of a process for docking of the apparatus 20 in the docking station 100. This process is in hardware, software or combinations of both, and performed in the control system 40 of the apparatus, typically by the microprocessor therein. Initially, battery voltage is monitored continuously, at block 202. This is typically done by any known monitoring program in the control system 40 and/or microprocessor thereof, that is electrically coupled to battery voltage sensors 50a (in the power system 52).

Figure 4:
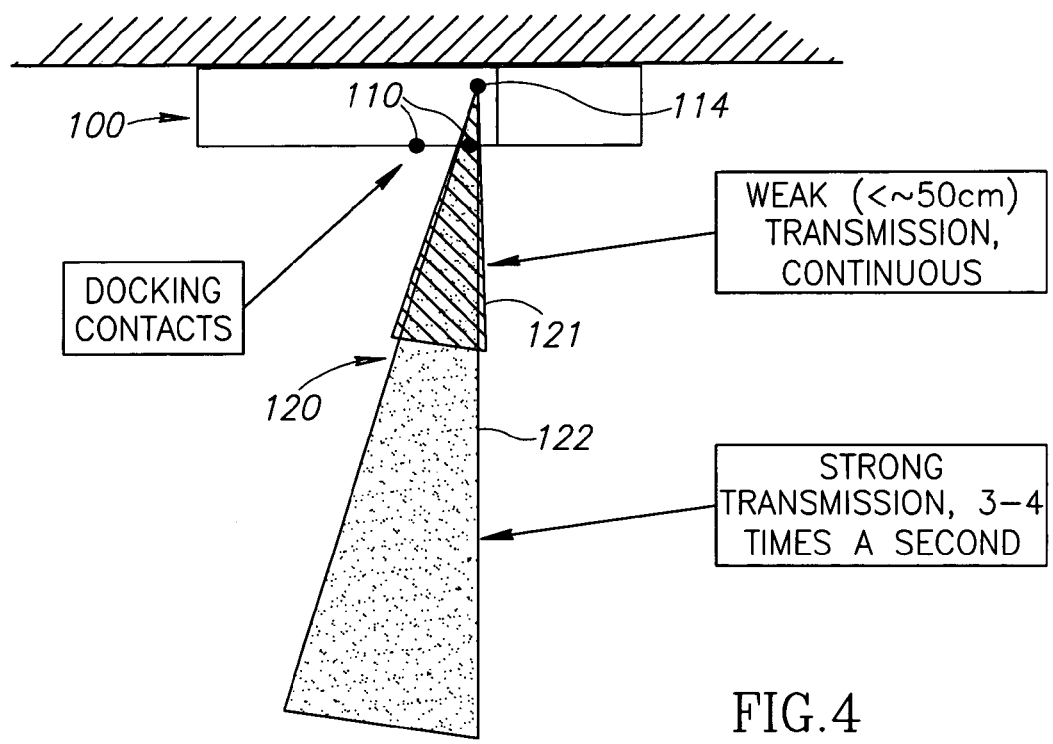
FIGS. 4 and 5 are schematic diagrams detailing portions of the docking process detailed in FIGS. 3A and 3B.
Figure 5:
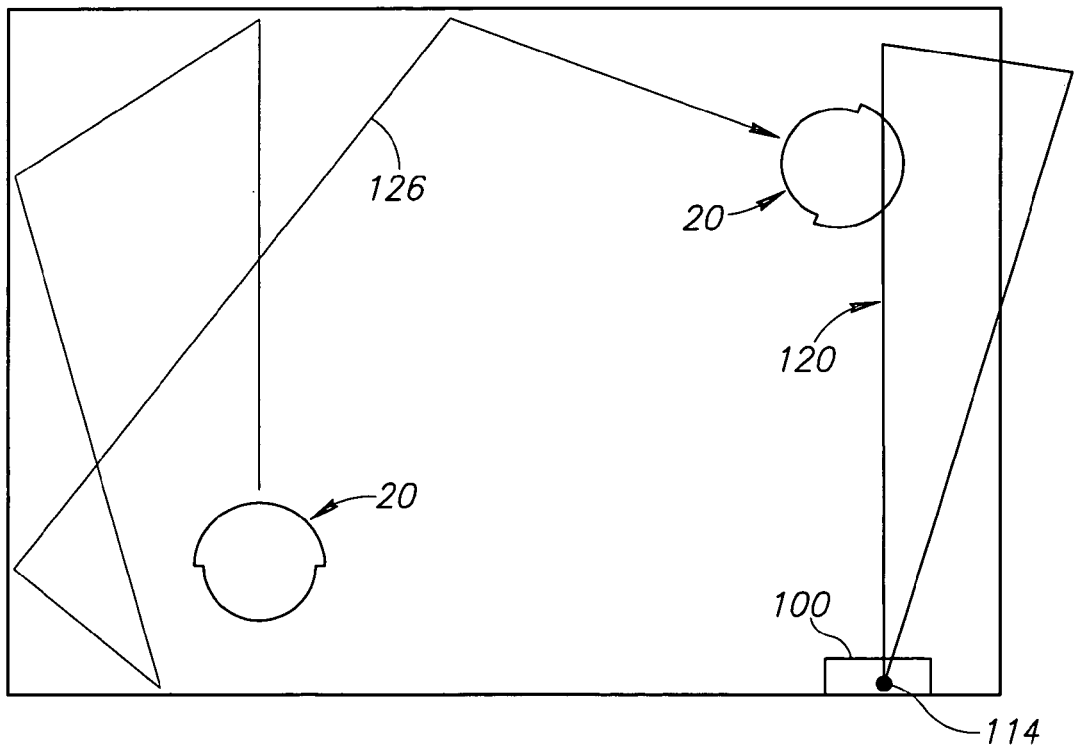

The movements of the apparatus 20 for docking are shown in FIGS. 4 and 5, and will be described in conjunction with this flow diagram.

Docking is initiated when battery voltage has reached or dropped below a predetermined level (first predetermined level), at block 204. For example, the docking process will be initiated when the battery voltage, for example, as detected in the control system 40, through sensors (voltage sensors 50a) in the power system 52, has dropped to or below (typically below) a predetermined or threshold voltage (a first predetermined or threshold voltage). For example, this predetermined or threshold voltage is 19 volts, indicative of the batteries 50 needing to be recharged.

If the battery voltage is above the predetermined or threshold voltage, the process returns to block 202. If the battery voltage is at or below the predetermined threshold, the process moves to block 206.

At block 206, the docking beam 120 from the docking station 100 is sought by the apparatus 20. Turning to FIG. 4, the docking beam 120 from the docking station 100 is now sought by the apparatus 20. Here, the apparatus 20 performs a seek for the docking beam 120. This "seek" typically includes the apparatus 20 operating in accordance with a random scan pattern, that is typically performed at a normal drive speed (and is illustrated, for example, by the pathway indicated by the pathway 126).

Throughout this "seek" process, there may be stopping events, at block 208 and the battery voltage of the apparatus 20 is monitored, at block 210, to see if it has fallen to or below (typically below) a predetermined or second threshold. These processes are contemporaneous, and their corresponding blocks in the flow diagram can be reversed.

The stopping event at block 208, can occur if the bumper/wheels are stuck or if a stair has been detected, or other unexpected event, that is considered inadequate for further pursuing the beam location or would not allow the apparatus 20 to move in a straight course to the docking station 100. If a stopping event has occurred, the process returns to block 206.

Battery voltage is monitored, at block 210. If the voltage has dropped at least to or below (and typically below) this second threshold, for example, 16 volts, the process moves to block 211, where the apparatus control system 40 signals the apparatus 20 to stop. This stoppage in at the present location of the apparatus 20. The stoppage is such that battery power has been exhausted to a level where a further battery discharge is not permissible and/or adequate operation of the apparatus 20 itself is no longer possible, then the apparatus 20 stops and shuts itself down completely to achieve a minimal level of power consumption.

If the battery voltage (as detected by the voltage sensors 50a and signaled to the control system 40) is above this second predetermined voltage, the process continues (from block 210) to block 212. The "seek" terminates when the docking beam 120, typically a strong docking beam 122, has been "seen", at block 212, so as to be detected by the at least one of the sensors 62a, 62b, 64a, 64b and 66, and subsequently located so as to be "registered" in the control system 40 of the apparatus 20.

During this "seek", the random scan pattern for the apparatus 20 is modified in the control system 40. For example, thresholds for stopping are relaxed such that the apparatus 20 will remain clear of obstacles and stop further away from them, than when in a normal cleaning or work mode (as detailed above).

However, should the docking beam 120 have been detected, but not located at block 212, the process returns to block 206.

With the docking beam now located, The process now moves to block 214, where homing is performed. Homing is typically in three sequences, beam confirmation, return, and repositioning. All three of these events are subject to stopping events, collectively referred to at block 216, that if one such stopping event occurs, the process returns to block 206.

Figure 6:
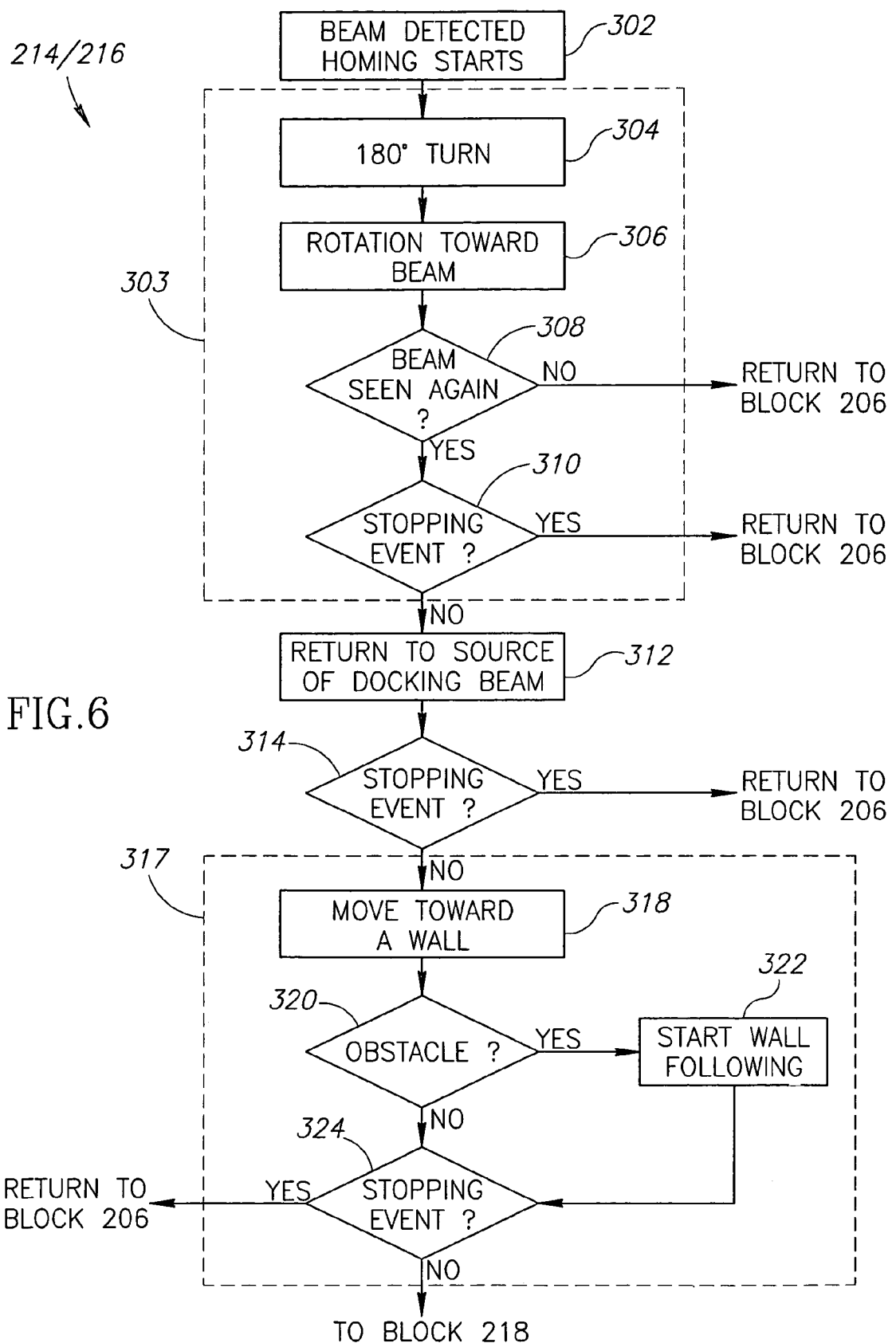
FIG. 6 is a flow diagram detailing homing of blocks 214/216 of FIGS. 3A/3B.
Figure 7:
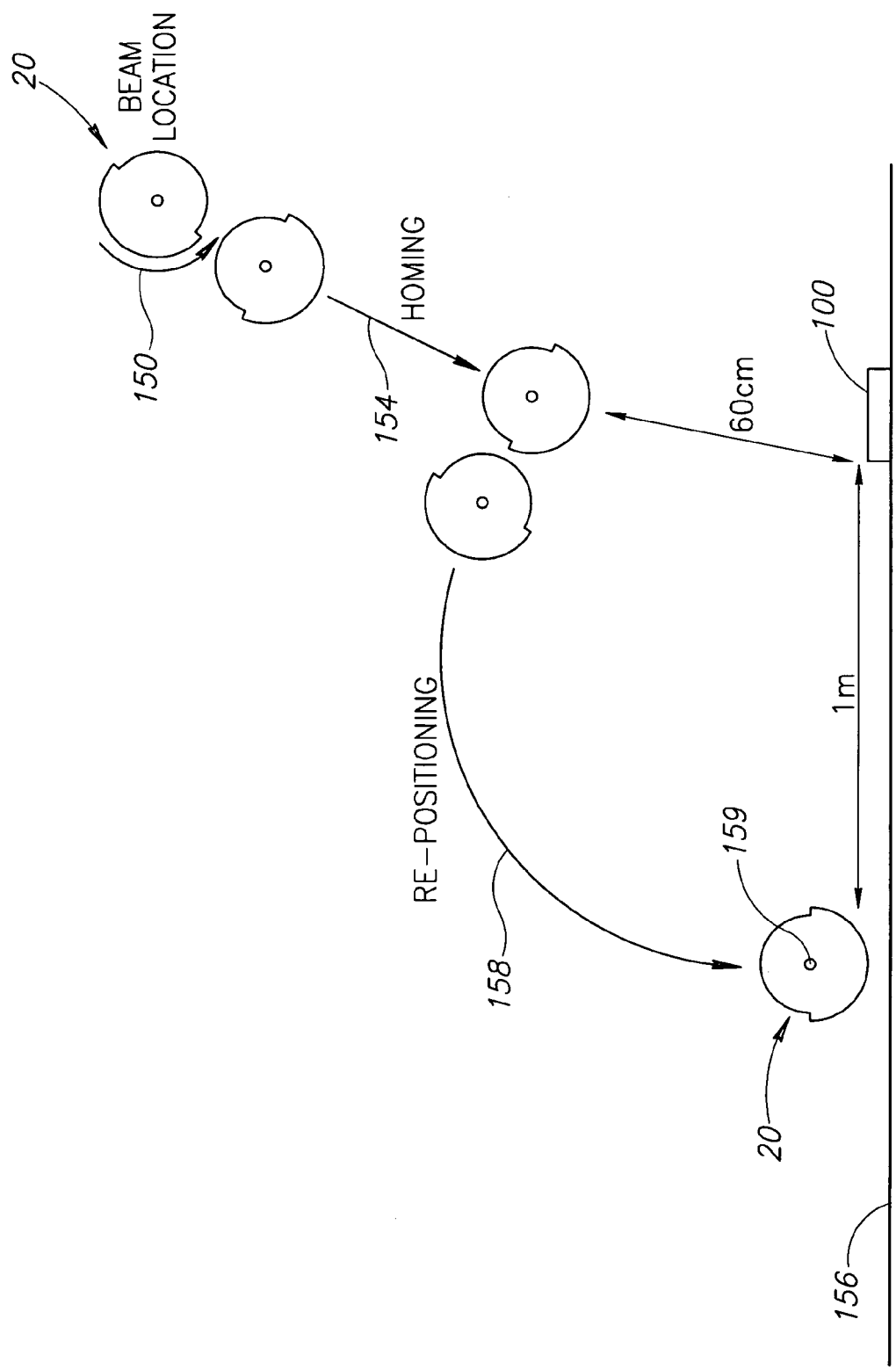
FIG. 7 is schematic diagram detailing portions of the process detailed in FIG. 6.

Homing is detailed in the flow diagram of FIG. 6 and the diagram of FIG. 7, to which attention is now directed.

Initially, homing starts at block 302, as the docking beam has been located (at block 212 above). The first portion of homing, beam confirmation, is in block 303. This block includes the subprocesses of the apparatus 20 performing a 180 degree turn in the direction from which the beam 120 was detected, as indicated by the arrow 150, at block 304. This 180 degree turn is in the direction the beam is most likely coming from, as determined by the sensor through which it was detected. A second rotation is then made, at block 306, typically placing the front end of the apparatus 20 in a substantially straight line with the source of the docking beam 120, by moving the apparatus 20 in the direction the beam is most likely coming from. This movement is in accordance with an estimation algorithm in the control system 40, for example, turning the apparatus 20 to the median angle of all of the angles from which an IR beam was received during the aforementioned 180-degree turn.

It is then determined if the beam 120 is detected again and registered or "seen", at block 308. If no, there is only the initial registration and this is considered to be a reflection. The process returns to block 206.

If the beam 120 has been "seen" at block 308, the process moves to block 310, where the presence of a stopping event is determined. Here, a stopping event occurs if the bumper/wheels are stuck or if a stair has been detected, or other unexpected event that is considered inadequate for further pursuing the beam location or would not allow the apparatus 20 to move in a straight course to the docking station 100. If a stopping event has occurred, the process returns to block 206.

If a stopping event has not occurred, the process proceeds to the return sequence, at block 312. Here, the apparatus 20 drives toward the source 114 of the beam 120 (for example, a beam transmitter) as indicated by the arrow 154. This movement toward the beam source continues until the apparatus 20 is approximately 60 cm from the beam transmitter 114 (FIG. 5), as determined by a proximity sensor (not shown) electrically coupled to the control system 40.

It is then determined if there is a stopping event, at block 314. If there is a stopping event, this return sequence stops, and the process returns to block 206. Stopping events occur if the bumper/wheels are stuck or a stair has been detected (as detailed for block 310 above).

If a stopping event has not occurred, the process proceeds to the repositioning sequence, at block 317. At block 318, the apparatus 20 moves toward an obstacle or object, for example, a wall 156. Initially, the apparatus 20 turns to the right and drives in a curved movement, as indicated by the arrow 158, toward the expected location of a wall 156. The apparatus 20 stops approximately 1 meter to the right of the docking station 100, at or proximate a location 159. However, if an obstacle is detected, at block 320, the apparatus 20 will stop and start a wall following procedure around it, at block 322, assuming it is part of the room's perimeter geometry, meaning a contour on its right side (wall-following around this obstacle). This wall following will eventually lead the apparatus 20 to the wall 156, where the docking station 100 is positioned.

It is then determined if there is a stopping event, at block 324, from blocks 310 and 314. If there is a stopping event, the process returns to block 206. Stopping events occur if the bumper/wheels are stuck or a stair has been detected (as detailed for blocks 310 and 314 above).

Figure 8:
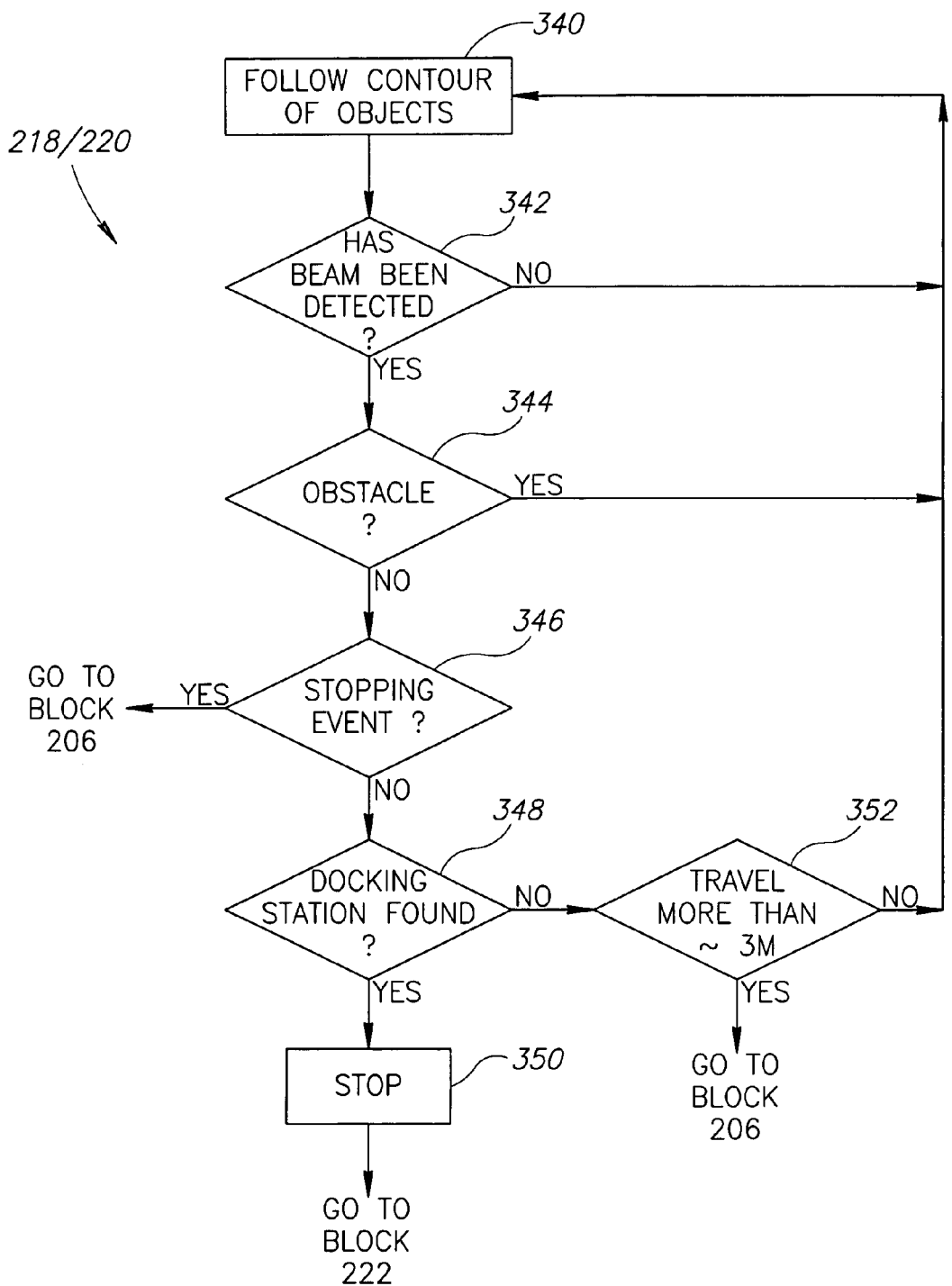
FIG. 8 is a flow diagram detailing the contour movement of blocks 218/220 of FIGS. 3A/3B.

If a stopping event of blocks 310, 314, 324, represented generally at block 216, has not occurred, the process moves to block 218, where a contour movement or wall following occurs. This contour movement terminates due to stopping events, collectively indicated at block 220. This contour movement of block 218 and stopping event of block 220 are described in detail in the flow diagram of FIG. 8 and FIG. 9, both figures to where attention is now directed.

Initially, at block 340, the apparatus 20 follows the contour of the object or obstacle, typically a wall 156. Here, the apparatus 20 (at the location 159) turns toward the docking station 100, as represented by the arrow 160, and follows the contour of the object to its right (as detailed above). Here, for example, the apparatus 20 follows the wall 156 (as detailed above). This following is in the path represented by the arrow 162 until one of the receivers 62a, 62b, 64a, 64b, 66 detects the signal, strong or weak, from the docking contacts 110, for example, here at a location 164.

Detection of the docking beam 120, by the apparatus 20 is noted, at block 342. If the docking beam 120 has not been detected, the process returns to block 340. If the docking beam 120 has been detected, it is then determined if there is an obstacle, at block 344. If an obstacle has been detected, the process returns to block 340. If an obstacle has not been detected, the process continues at block 346, where it is determined if there is a stopping event.

The stopping event can be that the bumper/wheels are stuck or a stair has been detected (as detailed for blocks 310, 314 and 324 above). If there is a stopping event, the process returns to block 206. If there is not a stopping event, the process moves to block 208.

While blocks 342, 344 and 346 have been shown in an order here, this is exemplary only, as the sub-processes of these blocks are performed contemporaneous with respect to each other. Any order for these blocks is suitable.

Figure 9:
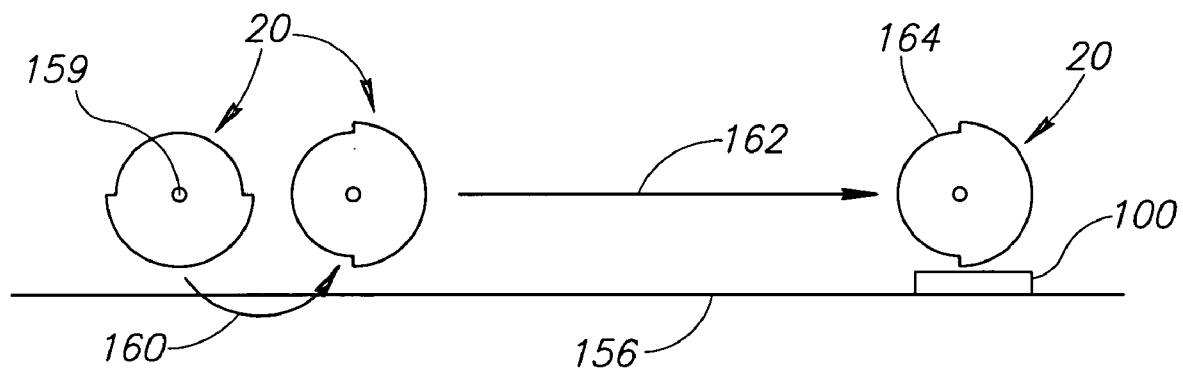
FIG. 9 is a schematic diagram detailing portions of the process detailed in FIG. 8.

At block 348, it is determined if the docking station 100 has been found by the apparatus 20. If the docking station 100 has been found, the apparatus 20 stops, at block 350, at a position proximate the docking station 100, as shown in FIG. 9. The process now moves to an alignment phase, at block 222.

If the docking station 100 was not found, it is determined (by an odometer or other distance measuring device in the apparatus 20) if the apparatus 20 has traveled more than 3 meters without finding the docking station 100, at block 352. If travel has not exceeded this approximately three meters, the process returns to block 340. If this approximately three meter distance has been exceeded, the process returns to block 206.

The apparatus 20 will now begin the alignment phase, at block 222. During this alignment phase, the apparatus 20 positions itself to be in alignment with the docking station 100. The alignment is such that if successful, the presence of a contact between the docking contacts 68 on the apparatus 20 and those 110 on the docking station 100 is detected, at block 224. If no contact is detected from any of the alignment procedures, the process moves to a reacquire phase, at block 240. If a contact is established, the process moves to block 226, where the end game for docking occurs.

Figure 10:
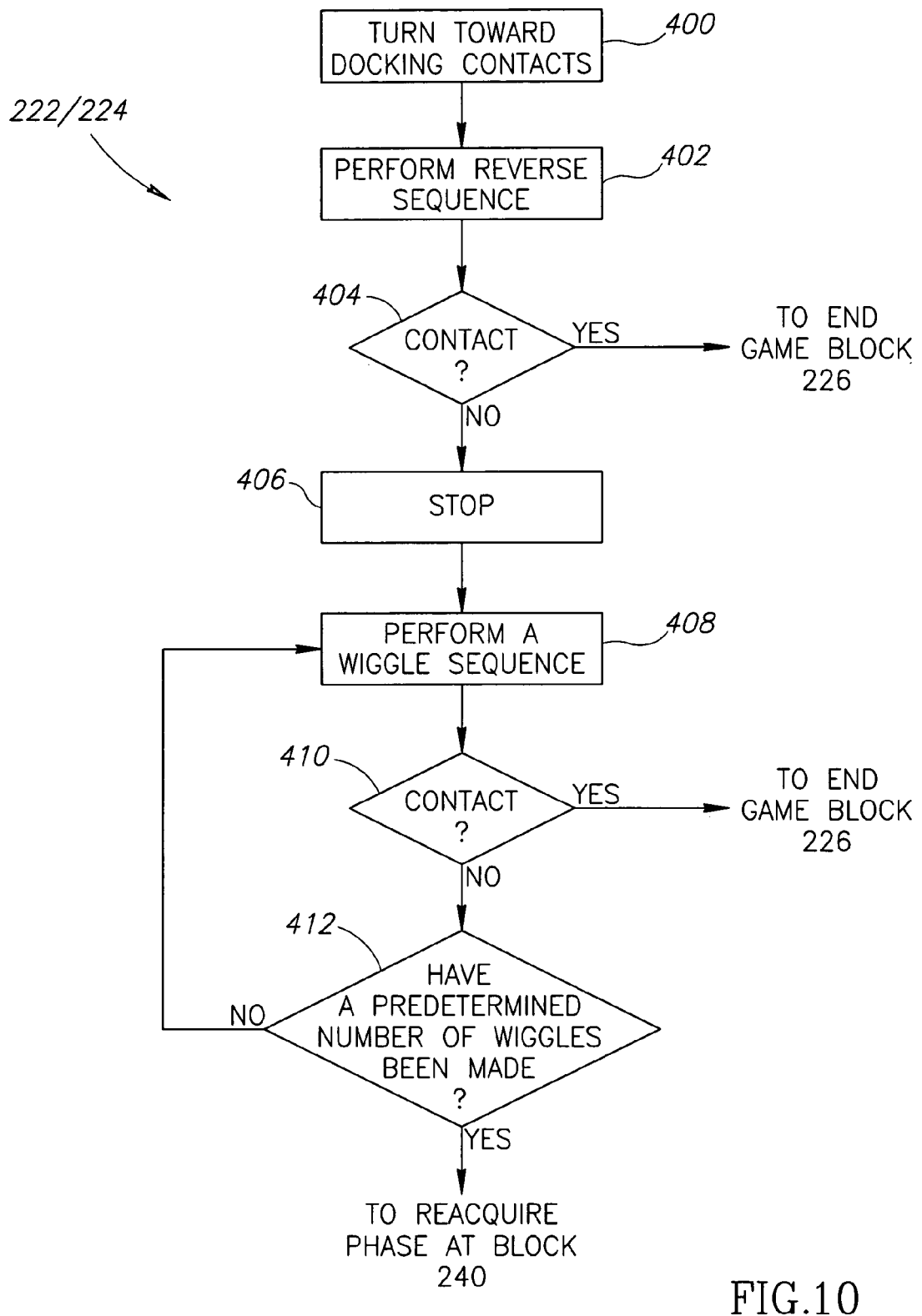
FIG. 10 is a flow diagram detailing the alignment phase of blocks 222/224 of FIGS. 3A/3B.
Figure 11:
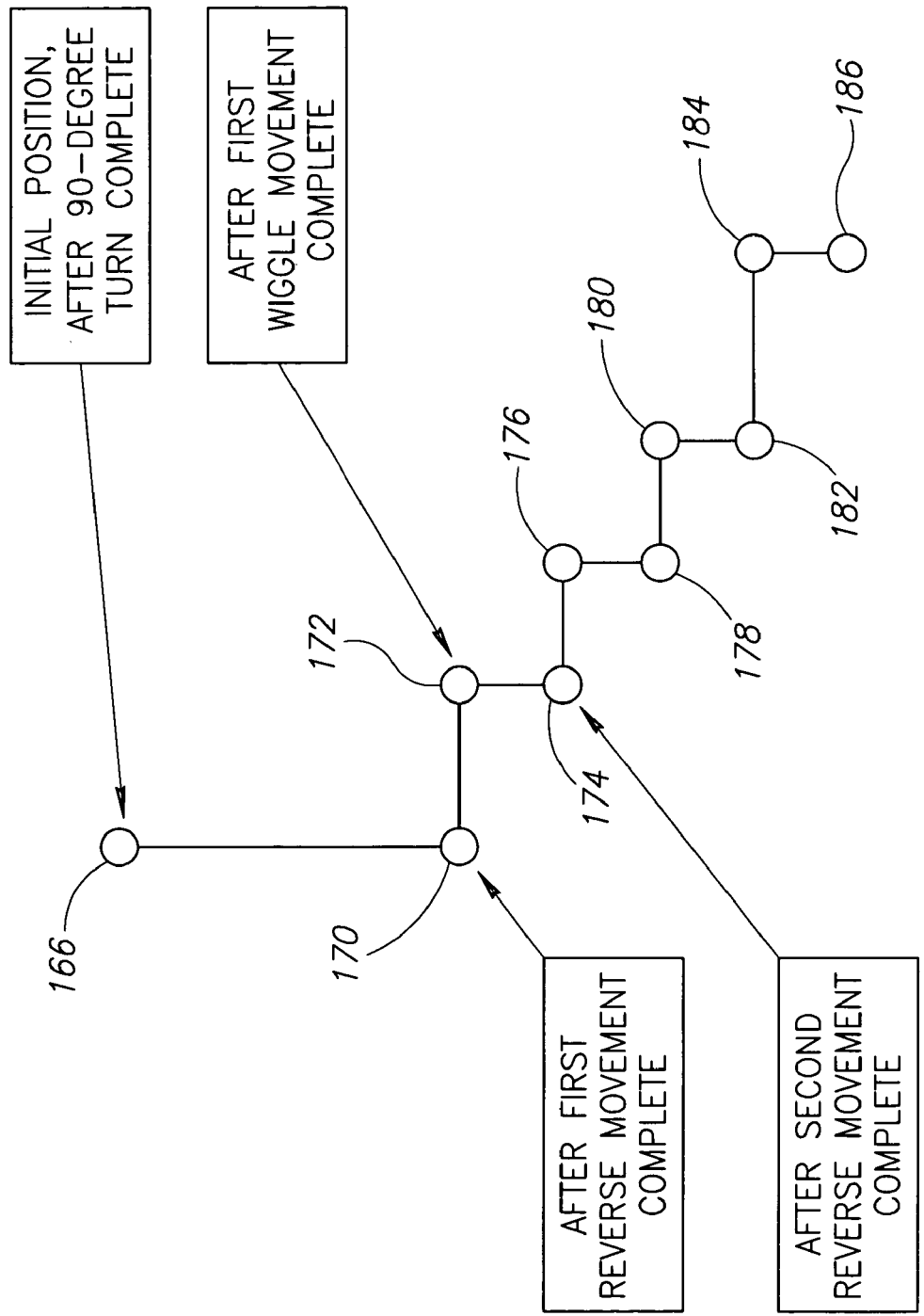
FIG. 11 is a schematic diagram detailing portions of the process detailed in FIG. 10.

The alignments phase of blocks 222 and 224 will now be described in detail, based on the flow diagram of FIG. 10, and FIG. 11.

Alignment begins at block 400 where the apparatus 20 performs a 90 degree turn (from location 164 of FIG. 8), the first sequence of docking. Specifically, the apparatus 20 rotates approximately 90 degrees to the left, such that its docking contacts 68 align with the docking contacts 110 of the docking station 100.

Next, at block 402, a reverse sequence is performed. Here, the apparatus 20 performs a short reverse movement, typically moving about 6 cm (to location 166), during which it is determined if there is a docking contact, at block 404, between the apparatus 20 and the docking station 100. This is typically determined through voltage measurements (as detected by the voltage sensors 69) on the docking contacts 68 on the apparatus 20 (as detailed above). For example, voltages suitable to for a sufficient "contact" in block 404 can be any predetermined positive voltage, typically approximately 20 volts or less. If there is a contact, the process moves to the end game or docking phase, at block 226 (FIG. 3A/3B).

If there is not a contact, the apparatus 20 stops, at block 406. A wiggle sequence, at block 408, is now performed. In this wiggle sequence, the apparatus 20, travels from an initial location 166, proximate to the docking contacts 110, to a new location 170, where it performs a short, approximately five degree, turn to the left, and traveling to a location 172, where a reverse movement is preformed. This reverse movement, for example, approximately 1 cm or less, terminates at the point 174.

At block 410, it is determined if the wiggle sequence resulted in a contact, as per block 404. If a contact is detected, the process moves to the end game at block 226. If a contact was not detected, the process moves to block 412, where it is determined if a predetermined number of wiggle sequences have been performed. This predetermined number is, for example, four. Accordingly, should the number of wiggle sequences attempted be four or less, the process returns to block 408, where a subsequent wiggle sequence is performed. Alternately, if the requisite number of wiggle sequences has been performed (for example, four here), the process moves to block 240, where a reacquire phase or sequence is performed. In this alignment phase, the contacts described at blocks 404 and 410 are collectively block 224 of FIGS. 3A/3B.

The process is now at the end game or docking phase, block 226. The end game results in the presence or non-presence of docking contact (between docking contacts 110 of the docking station 100 and corresponding docking contacts 68 of the apparatus 20), block 228. If successful, the docking contact is detected by the control system 40 (via the voltage sensors 69, as detailed above) as the voltage on the docking contacts 68 has reached a predetermined level, for example, approximately 20 or more volts (as detailed below), rendering the process complete. The process ends at block 230, as the apparatus 20 stops and its power system 52, for example its batteries 50 are charged (as electricity is being transmitted throughout the docking station 100 through the contacts 68 to the power system 52). If unsuccessful, the process returns to the reacquire phase, of block 240.

Figure 12:
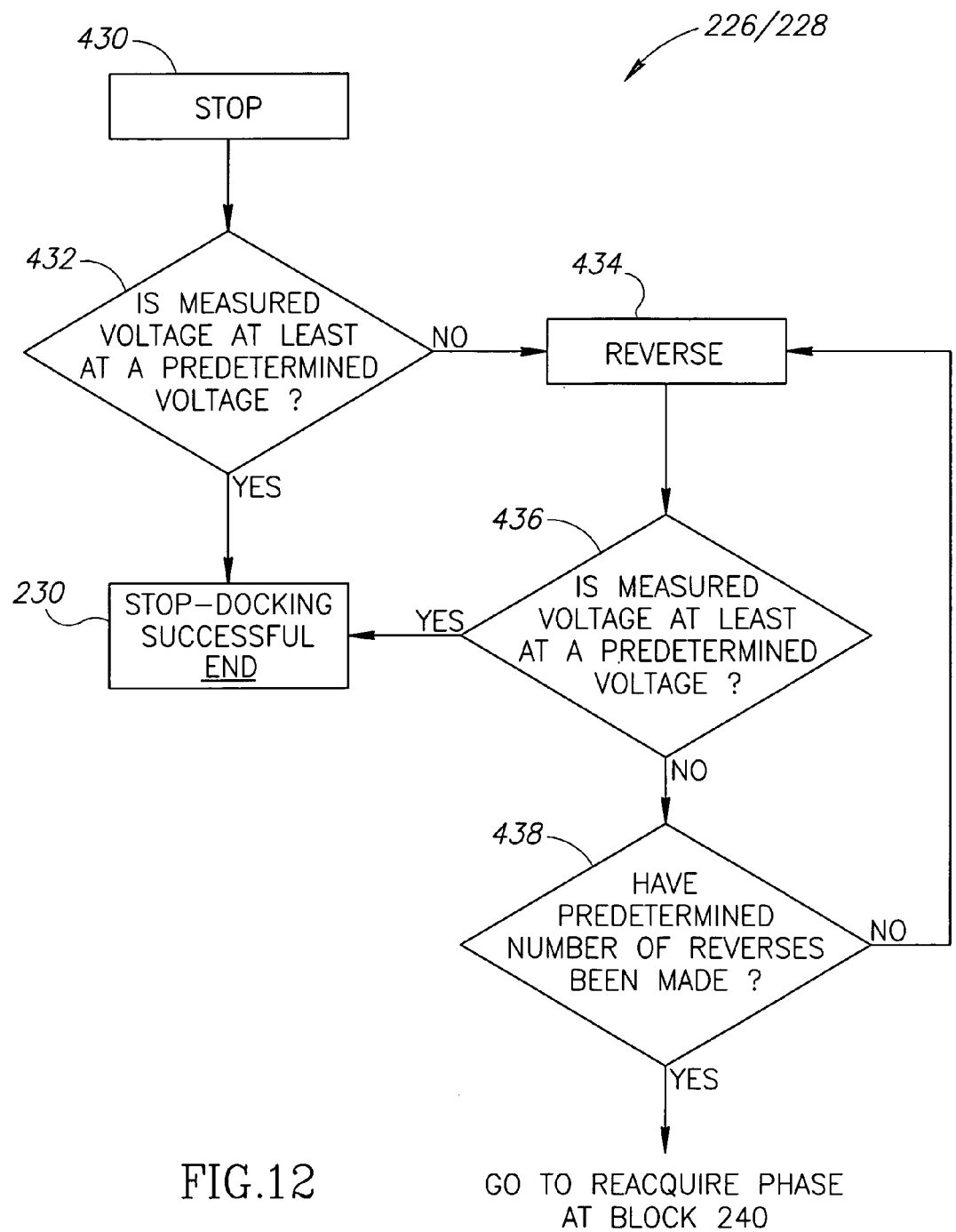
FIG. 12 is a flow diagram detailing the end game or final docking phase of blocks 226/228 of FIGS. 3A/3B.

Blocks 226–230 for the end game are now described in detail, in the flow chart of FIG. 12.

Initially, once a contact, between docking contacts 110 of the docking station 100 and docking contacts 68 of the apparatus 20, is detected by the control system 40 (through voltage sensors 69 in the power system 52) of the apparatus 20 (at block 224, and equivalent blocks 404 and 410), the apparatus 20 stops, at block 430. This stop is for a period of approximately 2 seconds, and is done to account for the spring-like behavior of the docking station 100, the possibility of a slippery floor surface or a thick carpet surface, as well as any potential small jolts that apparatus 20 experiences when coming to a full stop in the docking station 100. With the stop or rest period expired, the voltage on the docking contacts 68 of the apparatus 20 is measured, at block 432.

If a rise in the voltage is present, such as a rise in voltage to at least a predetermined voltage level, for example, approximately 20 volts, as sensed by the voltage sensors 69 electrically coupled to the docking contacts 68 (as detailed above), a docking contact (between the docking contacts 68 of the apparatus 20 and the docking contacts 110 of the docking station 100) is present, and the process moves to block 230. With an established docking contact (for example, at or above the predetermined level, here, 20 or more volts), the process is complete, as the apparatus 20 is charging (as detailed above). If a voltage was detected below the predetermined level, for example, approximately 20 volts, as detailed above, a momentary contact was made between the docking contacts 68, 110, of the apparatus 20 and docking station 100, respectively, but these contacts are no longer present after the stop period. As a result, a reverse movement is initiated, at block 434, in an attempt to reestablish the contact.

This reverse movement, at block 434, is, for example, a short movement, of approximately 1 cm. With this reverse movement complete, the voltage on the docking contacts 68 of the apparatus 20 is again measured, at block 436. This measurement is in accordance with that described for block 432 above.

If a rise in the voltage, for example, to the predetermined level of approximately 20 or more volts, as detailed above, a docking contact (as detailed above) is present, and the process moves to block 230, where it is complete, as the apparatus 20 is charging (as detailed above). If no rise in voltage has been detected, for example, a momentary contact was made between the docking contacts 68, 110, but the contacts 68 of the apparatus 20 are not touching or are not coupled with the contacts 110 of the docking station 100, it is then determined if a predetermined number of reverses have been made, at block 438. This predetermined number of reverses is for example, two. If two or fewer reverses have been made, the process returns to block 434. If two reverses have been made, the process moves to the reacquire phase of block 240.

Figure 13:
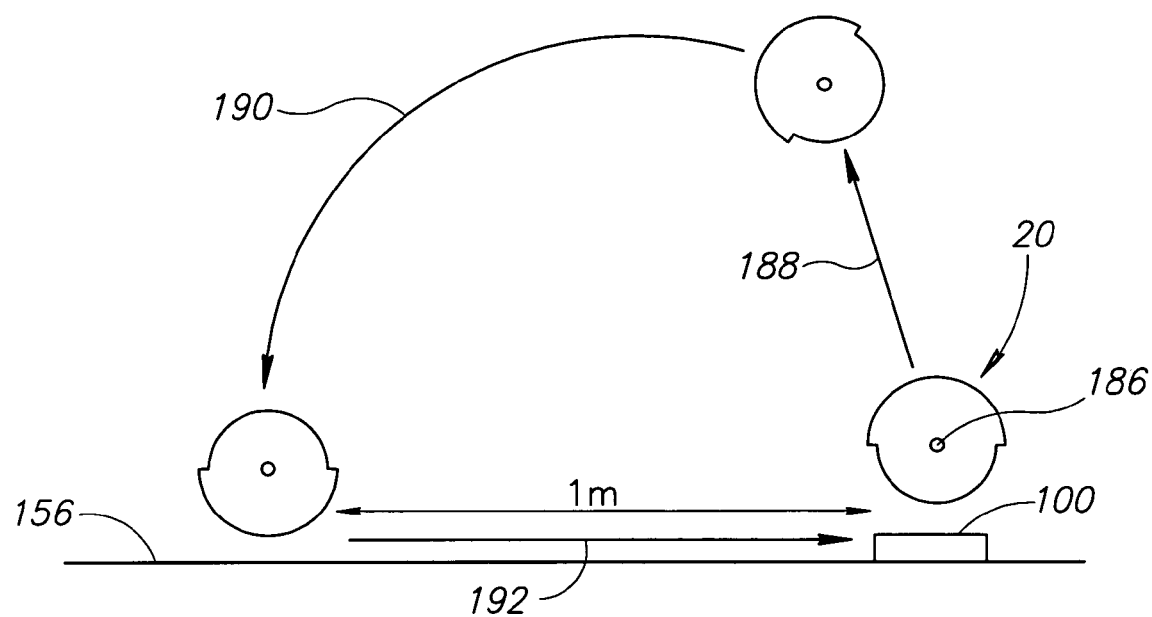
FIG. 13 is a schematic diagram detailing the reacquire sequence (phase) of FIGS. 3A/3B.

Turning also to FIG. 13 and back to FIGS. 3A/3B, this reacquire phase or sequence, of block 240 is shown. The apparatus 20, for example, is at point 186, proximate to the docking station 100. A movement is now made in a direction away from the docking station 100, in the direction of the arrow 188. The movement then continues with a curved portion 190, ending in a position proximate to the wall 156, and a predetermined distance, for example, approximately 1 meter, from the docking station 100.

At this point, it is determined if this attempt at the reacquire phase is within a predetermined number of attempts, for example, typically four, at block 242. If this is the fourth or less attempt at the reacquire phase (of block 240), the process returns to block 218, where the contour movement resumes (and the apparatus will move along the wall 156 as indicated by the arrow 192). Otherwise, if four attempts have been made at the reacquire phase, the process terminates at block 210. Here, the docking procedure has failed and the apparatus 20 will shut down, typically to a power conserving mode, with no further docking attempts performed.

EXAMPLE

Figure 14:
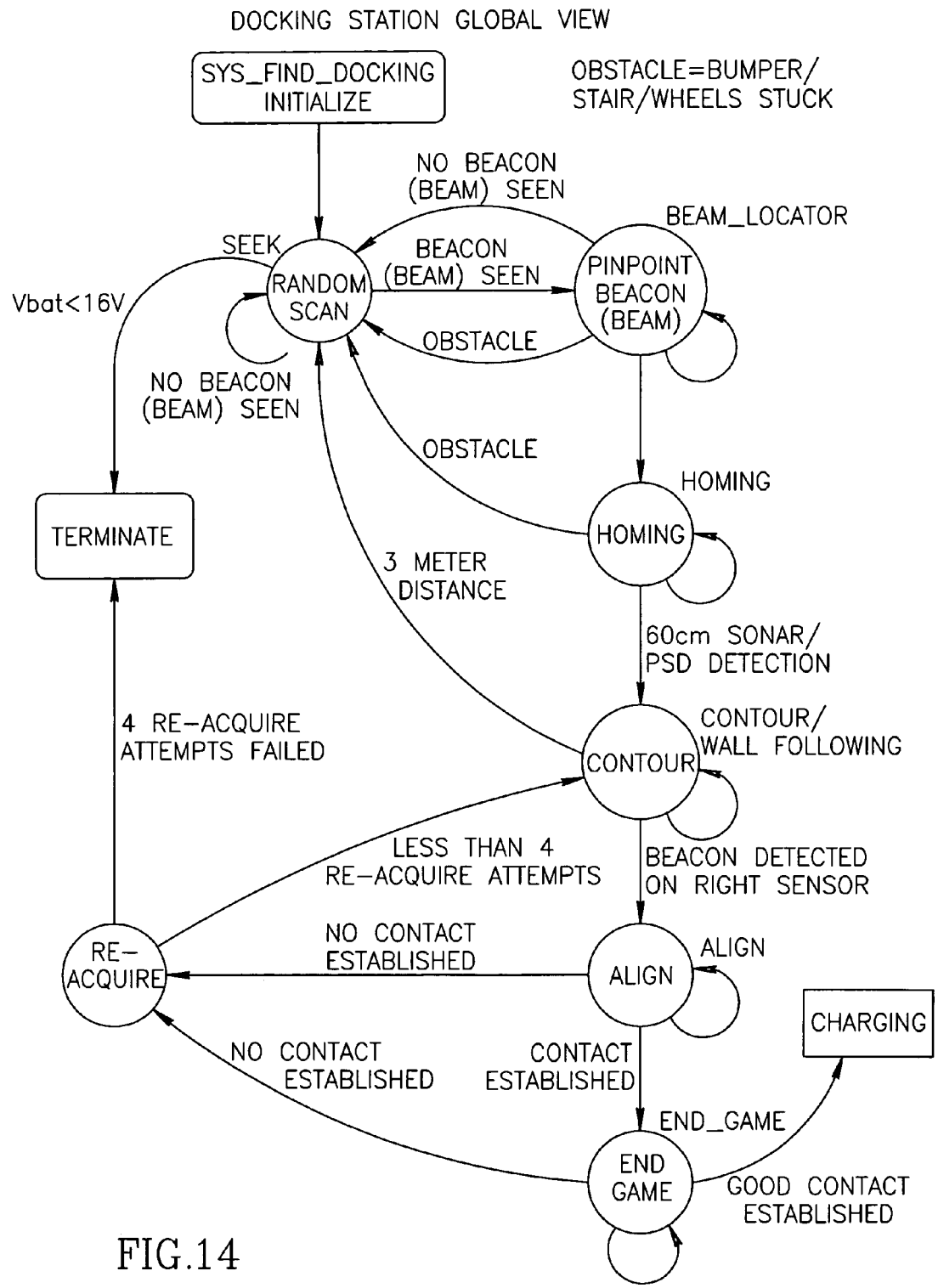
FIGS. 14–19 are state diagrams detailing an exemplary operation of the apparatus of FIG. 1.
Figure 15:
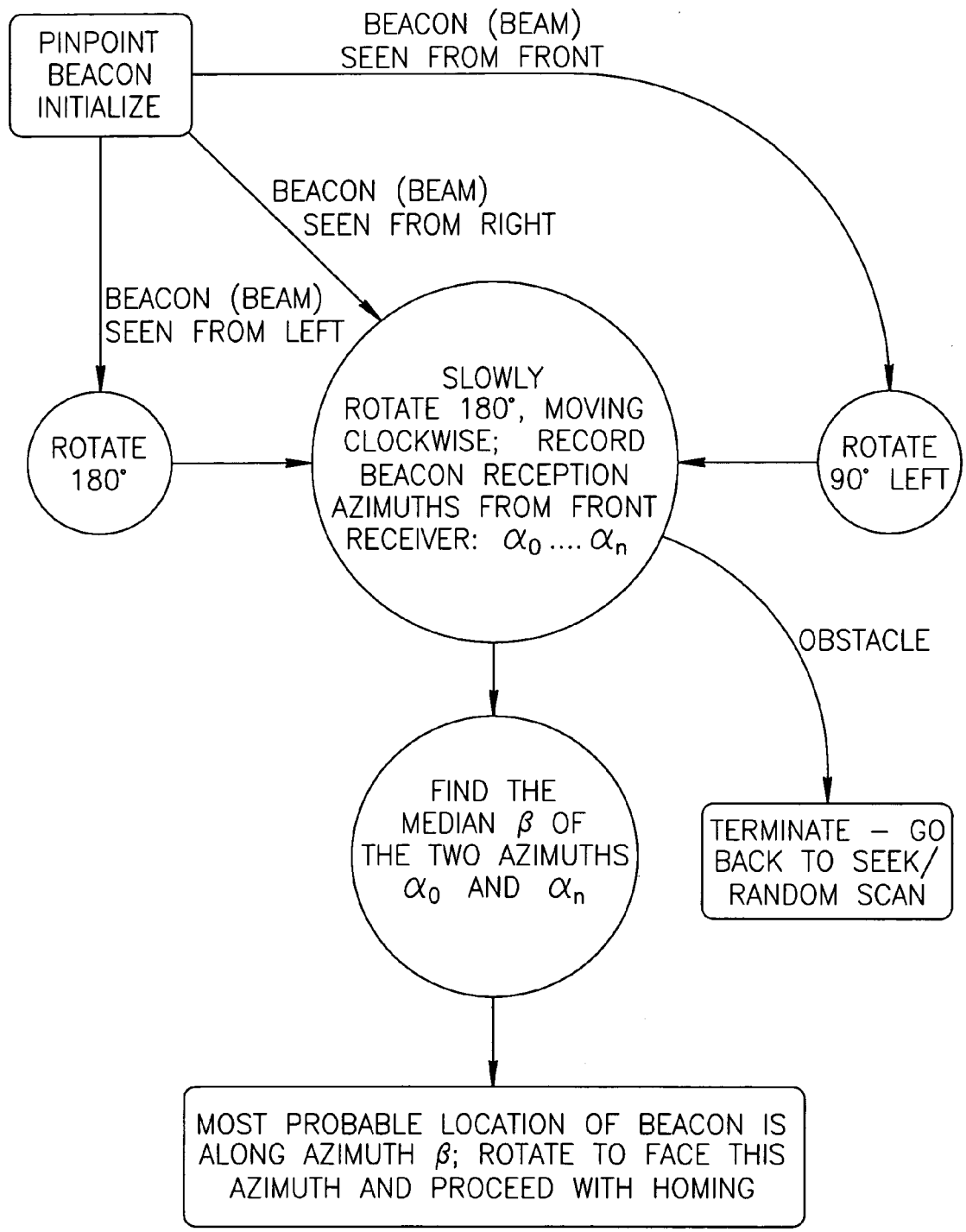
Figure 16A:
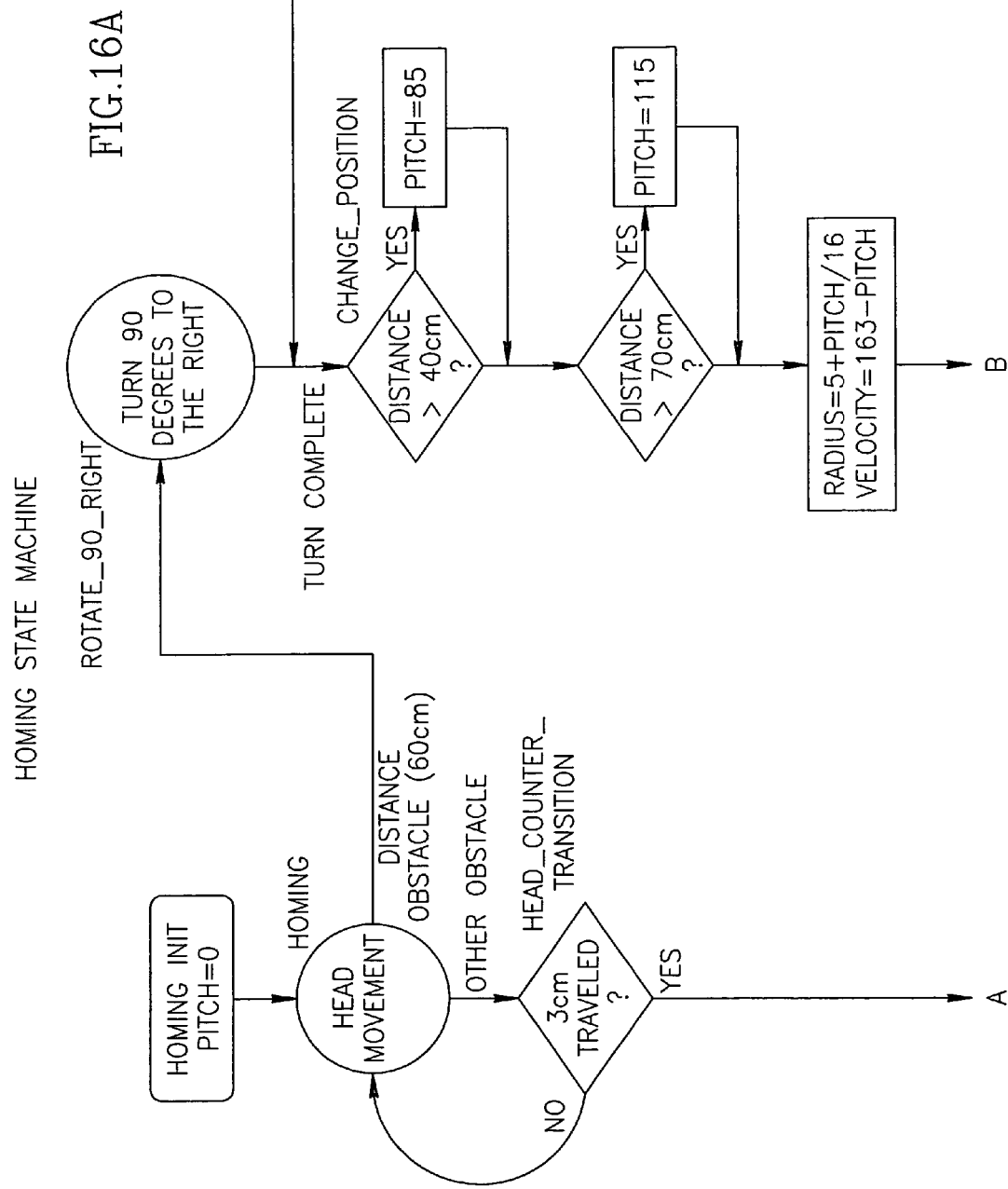
Figure 16B:
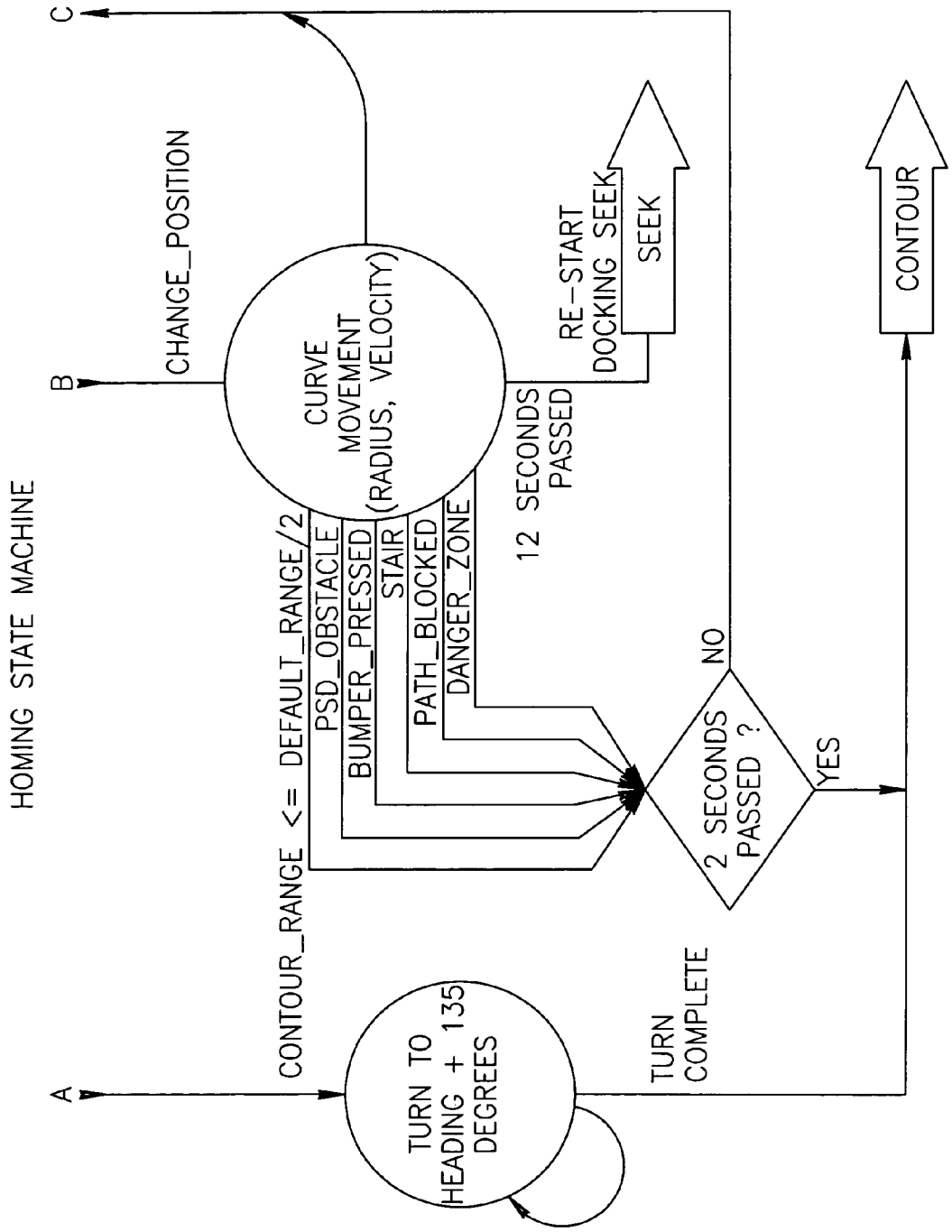
Figure 17:
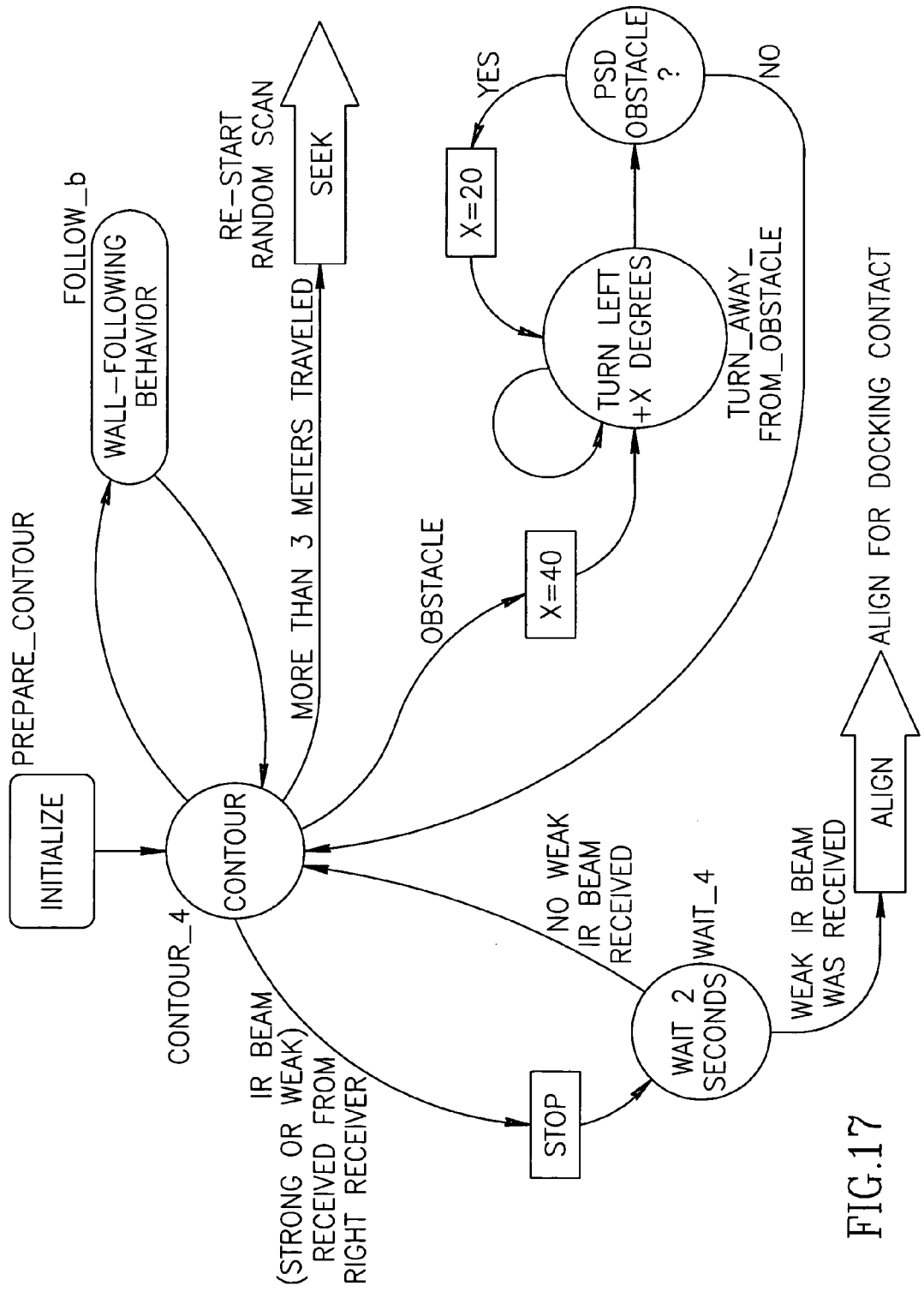
Figure 18:
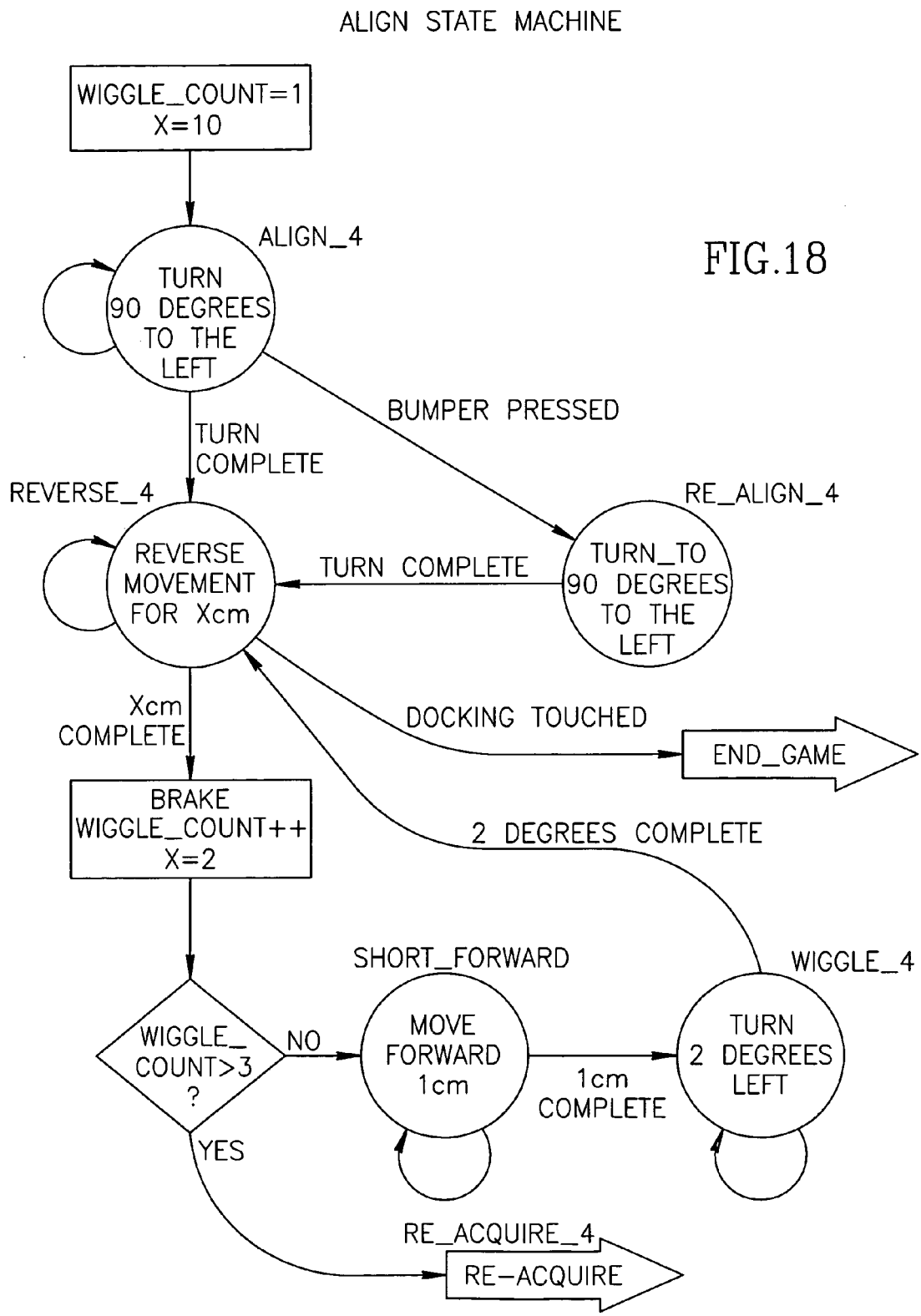
Figure 19:
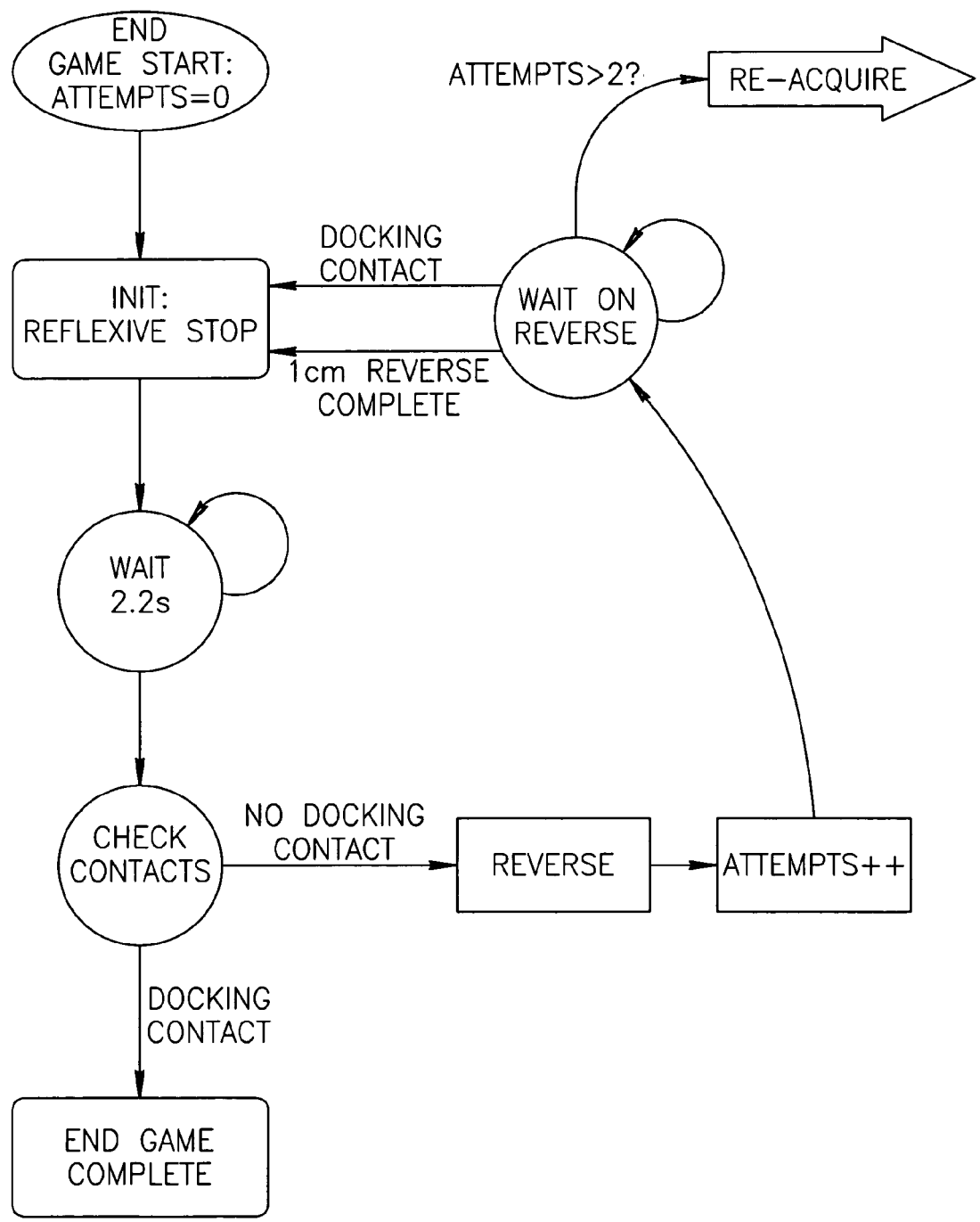

FIGS. 14–19 are state diagrams detailing an operative example of a docking process, in accordance with FIGS. 1–13 shown and described above. While these state diagrams are for the apparatus 20, detailed above, other autonomous robots, machines or the like can also be operated in accordance with these exemplary state diagrams. FIG. 14 shows the entire docking process, while FIGS. 15–19 detail portions of the process listed in FIG. 14.

The processes (methods) (including sub-processes) and systems (including components) described herein have been described with exemplary reference to specific hardware and/or software. These methods have been described as exemplary, whereby specific steps and their order can be omitted, and/or changed by persons of ordinary skill in the art to reduce embodiments of the above disclosed processes and systems to practice without undue experimentation. The processes and systems have been described in a manner sufficient to enable persons of ordinary skill in the art to readily adapt other commercially available hardware and/or software as may be needed to reduce any of the above disclosed embodiments to practice.

Thus, there has been shown and described an apparatus, method and system for docking an autonomous robot or machine, which fulfills all the objects and advantages sought therefor. It is apparent to those skilled in the art, however, that many changes, variations, modifications, and other uses and applications for the apparatus, method and system of docking and resultant media are possible, and also such changes, variations, modifications, and other uses and applications, which do not depart from the spirit and scope of the invention are deemed to be covered by the invention, which is limited only by the claims which follow.

What is claimed is:

1. A method for docking an autonomous robot in a docking station comprising:
    monitoring battery voltage of the robot;
    initiating docking of the robot in the docking station when the battery voltage has been detected to have fallen to a first predetermined level;
    locating at least one signal for the docking station; and,
    while the battery voltage remains between the first predetermined level and a second predetermined level, the second predetermined level less than the first predetermined level,
    moving the robot toward the docking station.

2. The method of claim 1, additionally comprising:
    ceasing movement of the robot when the battery voltage has fallen to at least the second predetermined level.

3. The method of claim 1, wherein the locating at least one signal for the docking station includes, seeking and detecting a signal from the docking station for a first time and detecting the signal from the docking station for a second time.

4. The method of claim 1, wherein moving the robot toward the docking station includes, moving the robot toward an obstacle.

5. The method of claim 4, wherein moving the robot toward the docking station includes, moving the robot along the obstacle to a point proximate the docking station.

6. The method of claim 5, wherein moving the robot toward the docking station includes, the robot performing at least one wiggle movement toward the docking station.

7. The method of claim 1, wherein moving the robot toward the docking station includes, terminating movement of the robot when the robot has reached the docking station and is in docking contact with the docking station.

8. The method of claim 7, wherein the docking contact includes, at least one electrical contact between the robot and the docking station, the at least one electrical contact facilitating electricity for moving from the docking station to the robot for charging at least one battery in the robot.

9. The method of claim 7, additionally comprising: the robot performing vacuuming.

10. The method of claim 7, additionally comprising: the robot performing lawn mowing.

11. A method for docking an autonomous robot in a docking station comprising:
    monitoring battery voltage of the robot;
    initiating docking of the robot in the docking station when the battery voltage has been detected to have fallen to at least a first predetermined level;
    locating at least one signal for the docking station and confirming that the at least one signal for the docking station has been located; and,
    while the battery voltage remains between the first predetermined level and a second predetermined level, the second predetermined level less than the first predetermined level, moving the robot toward the docking station.

12. The method of claim 11, additionally comprising: ceasing movement of the robot when the battery voltage has fallen to at least the second predetermined level.

13. The method of claim 11, wherein moving the robot toward the docking station includes, moving the robot toward an obstacle.

14. The method of claim 13, wherein moving the robot toward the docking station includes, moving the robot along the obstacle to a point proximate the docking station.

15. The method of claim 14, wherein moving the robot toward the docking station includes, the robot performing at least one wiggle movement toward the docking station.

16. The method of claim 11, wherein moving the robot toward the docking station includes, terminating movement of the robot when the robot has reached the docking station and is in docking contact with the docking station.

17. The method of claim 16, wherein the docking contact includes at least one electrical contact between the robot and the docking station, the at least one electrical contact facilitating electricity for moving from the docking station to the robot for charging at least one battery in the robot.

18. The method of claim 11, additionally comprising: the robot performing vacuuming.

19. The method of claim 11, additionally comprising: the robot performing lawn mowing.

20. An autonomous robot comprising:
    a movement system for moving the robot over a surface;
    a power system for providing power to the robot, the power system including at least one sensor for detecting power levels; and
    a control system in communication with the movement system and the power system, the control system including a processor programmed to:
        monitor the power level of the power system;
        initiate a docking process for the robot to return to the docking station when the power level has fallen to a first a predetermined level; and,
        continue the docking process by causing the robot to move toward the docking until the power level has fallen to a second predetermined level, the second predetermined level being less than the first predetermined level.

21. The robot of claim 20, wherein the processor programmed to continue the docking process includes: causing the robot to move into contact with the docking station.

22. The robot of claim 20, wherein the processor is additionally programmed to: cause the robot to stop if the power level has fallen to at least the second predetermined level.

23. An autonomous robot comprising:
    a movement system for moving the robot over a surface;
    at least one sensor for detecting a signal for a docking station;
    a power system for providing power to the robot, the power system including at least one sensor for detecting power levels; and,
    a control system in communication with the movement system, the at least one sensor for detecting a signal for a docking station, and, the power system; the control system including a processor programmed to:
        monitor the power level of the power system;
        initiate a docking process for the robot to return to a docking station when the power level has fallen to a first a predetermined level; and, continue the docking process including:
- receiving at least one signal from the at least one sensor that a signal for a docking station has been detected;
- responding to the received at least one signal by causing the movement system to move the robot toward the docking station; and,
- continuing the docking process including, operating the robot until the power level has fallen to a second predetermined level, the second predetermined level being less than the first predetermined level.

24. The robot of claim 23, wherein the processor programmed to continue the docking process includes: causing the robot to move into contact with the docking station.

25. The robot of claim 23, wherein the processor is additionally programmed to: cause the robot to stop if the power level has fallen to at least the second predetermined level.

* * * * *